(12) United States Patent
Kamihira

(10) Patent No.: US 6,961,625 B2
(45) Date of Patent: Nov. 1, 2005

(54) CHARACTERISTIC CONTROL DEVICE FOR CONTROL SUBJECT

(75) Inventor: Ichikai Kamihira, Shizuoka-ken (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 754 days.

(21) Appl. No.: 09/824,462

(22) Filed: Apr. 2, 2001

(65) Prior Publication Data

US 2002/0023062 A1 Feb. 21, 2002

(30) Foreign Application Priority Data

Apr. 4, 2000 (JP) .......................................... 2000-101999
Apr. 12, 2000 (JP) .......................................... 2000-111016

(51) Int. Cl.⁷ .............................................. G05B 13/02
(52) U.S. Cl. .............................. 700/28; 700/1; 700/19; 700/20; 700/37; 700/47; 700/50
(58) Field of Search ................................. 700/1, 19–20, 700/28, 37, 47–48, 50; 706/2, 13–14, 25, 1, 11; 701/102, 104, 106, 115, 109–110, 58–59

(56) References Cited

U.S. PATENT DOCUMENTS

| 4,639,852 | A | * | 1/1987 | Motomiya ........................ 700/9 |
| 4,864,490 | A | * | 9/1989 | Nomoto et al. ................. 700/37 |
| 5,043,862 | A | | 8/1991 | Takahashi et al. ............. 700/42 |
| 5,213,077 | A | * | 5/1993 | Nishizawa et al. .......... 123/352 |
| 5,267,348 | A | * | 11/1993 | Someya et al. ................ 706/52 |
| 5,546,506 | A | | 8/1996 | Araki et al. ................... 706/61 |
| 5,971,579 | A | | 10/1999 | Kim ............................ 700/42 |
| 6,032,139 | A | | 2/2000 | Yamaguchi et al. ........... 706/13 |
| 6,510,353 | B1 | * | 1/2003 | Gudaz et al. ................. 700/37 |
| 2003/0093392 | A1 | * | 5/2003 | Ulyanov ....................... 706/13 |

FOREIGN PATENT DOCUMENTS

| EP | 0 715 253 A2 | 6/1996 |
| EP | 0 957 416 A1 | 11/1999 |
| EP | 0 969 385 A2 | 1/2000 |

* cited by examiner

Primary Examiner—Anthony Knight
Assistant Examiner—Ronald D Hartman, Jr
(74) Attorney, Agent, or Firm—Knobbe, Martens Olson & Bear LLP

(57) ABSTRACT

A characteristic control device which is provided with a basic control module which determines the amount of control used to control the output of a control subject based on predetermined input data and control parameters which relate output to the control subject to the input data and which controls the characteristics of the control parameters, a characteristic storage mechanism for storing the basic control parameters, and a characteristic automatic modification mechanism which determines, in accordance with predetermined conditions, and automatically modifies, the control parameters which are applied to the basic control module based on the basic control parameters stored in the characteristic storage mechanism and the input data.

9 Claims, 24 Drawing Sheets

*1 Basic Control Parameters, Characteristic Data
*2 Basic Control Parameter – Characteristic Data Group

CHARACTERISTIC CONTROL DEVICE FOR CONTROL SUBJECT

BACKGROUND OF THE INVENTION

1. Field of the Invention

The present invention relates to a characteristic control device that is capable of altering the characteristics of a control subject. In accordance with the conditions of use of the control subject, such as the level of skill or preference of the operator or the environment in which the control subject is used.

2. Description of the Related Art

Technology which modifies the characteristics of a control module (that is to say, the parameter values which determine the relationship between the input and output of the control module) in accordance with the conditions of use of a control subject, in order to control the control subject, is disclosed in Japanese Patent Application Laid Open No. 11-210517.

Concretely, in Japanese Patent Application Laid Open No. 11-210517, it is disclosed that the travel conditions are determined, the characteristics of an electric throttle are modified in accordance with the travel conditions, and the drive force characteristics are optimized with respect to accelerator operation.

However, in the conventional technology described above, the determination of the travel characteristics is conducted using a single fuzzy rule determined in advance, and furthermore, the modification of the characteristics can be conducted only within a preset algorithm scope, so that a problem occurs in that the technology is completely incapable of adapting to the preferences of individual users, to changes in the condition or level of skill of users from day to day, to changes in the environment of use, and to manufacturing variations in the subject of control.

The modification of preset fuzzy rules has been considered as one way of solving such problems; however, a high degree of knowledge and technology is required in order to accomplish this, and a user himself is incapable of conducting such customizing, while it is impossible to modify the algorithm used to calculate the target drive force (that is to say, the characteristics) after the determination of the travel conditions.

As described above, in accordance with this conventional technology, it is possible to adapt the control module characteristics, which serve to control the control subject, to the conditions of use to a certain extent; however, this is only possible within the scope which may be foreseen by the designer. Thus, this technology is not capable of satisfying the preferences of an unspecified large number of individual users, nor is it capable of responding to daily changes in the condition of even one user, or changes in skill level, or manufacturing variation in the control subject.

SUMMARY OF THE INVENTION

The present invention has as an object thereof to provide a characteristic control device which solves the problems described above with the conventional technology and which is capable of flexibly modifying the characteristics of the control subject in accordance with the level of skill or preferences of a user and with the conditions of use of the control subject, such as the environment in which the control subject is used.

In order to achieve this object, an aspect of the present invention provides a characteristic control device which is provided with a basic control module which determines the amount of control used to control the output of a control subject based on predetermined input data and control parameters which relate output to the control subject to the input data and which controls the characteristics of the control parameters, a characteristic storage mechanism for storing the basic control parameters, and a characteristic automatic modification mechanism which determines, in accordance with predetermined conditions, and automatically modifies, the control parameters which are applied to the basic control module based on the basic control parameters stored in the characteristic storage mechanism and the input data.

Furthermore, in another aspect of the present invention, a characteristic control device is provided which is provided with a characteristic control module which controls the characteristics of the control parameters and is provided separately from a control device which is provided with a basic control module which determines the amount of control used to control the output of a control subject based on predetermined input data and control parameters which relate the output to the control subject to the input data, a characteristic storage mechanism which stores the basic control parameters, and a characteristic automatic modification mechanism which determines and automatically modifies the control parameters which are applied to the basic control module, based on the basic control parameters stored in the characteristic storage mechanism and the input data.

Furthermore, in another aspect of the present invention, a characteristic control device is provided which is provided with a basic control module which determines the amount of control used to control the output of a control subject based on predetermined input data and control parameters which relate output to the control subject to the input data and which controls the characteristics of the control parameters, which characteristic control device is further provided with a characteristic generation mechanism which generates basic control parameters which serve as the basis of the control parameters by conducting predetermined evaluations based on the input data, a characteristic storage mechanism for storing the basic control parameters, and a characteristic automatic modification mechanism which determines, in accordance with predetermined conditions, and automatically modifies the control parameters which are applied to the basic control module based on the basic control parameters stored in the characteristic storage mechanism and the input data.

Furthermore, in another aspect of the present invention, a characteristic control device is provided which is provided with a basic control module which determines the control values employed to control the output of the control subject based on predetermined input data and control parameters which relate the output to the control subject to the input data, and which controls the characteristics of the control parameters, which characteristic control device is further provided with a characteristic generation mechanism for generating the basic control parameters which serve as a basis for the control parameters, in accordance with predetermined evaluation standards, a characteristic storage mechanism for storing the basic control parameters, a characteristic automatic modification mechanism for determining, in accordance with predetermined conditions, and automatically modifying the control parameters which are applied to the basic control module based on the basic control parameters stored in the characteristic storage mechanism and the input data, and a user interface mechanism which permits a user to directly manipulate the basic control parameters generated by the characteristic generation mechanism.

Furthermore, in accordance with still another aspect of the present invention, a characteristic control device is provided which is provided with a characteristic control module which controls the characteristics of the control parameters and is provided separately from a control device which is provided with a basic control module which determines the amount of control used to control the output of a control subject based on predetermined input data and control parameters which relate the output to the control subject to the input data, which characteristic control device is further provided with a characteristic generation mechanism for generating basic control parameters that serve as the basis of the control parameters, in accordance with predetermined evaluation standards, a characteristic storage mechanism which stores the basic control parameters, and a characteristic automatic modification mechanism which determines and automatically modifies the control parameters which are applied to the basic control module, based on the basic control parameters stored in the characteristic storage mechanism and the input data.

DETAILED DESCRIPTION OF THE PREFERRED EMBODIMENT

The characteristic control device for control subjects in accordance with the present invention (below simply referred to as the "characteristic control device") will be explained with reference to a number of embodiments depicted in the attached figures.

First Embodiment

Figure 1:
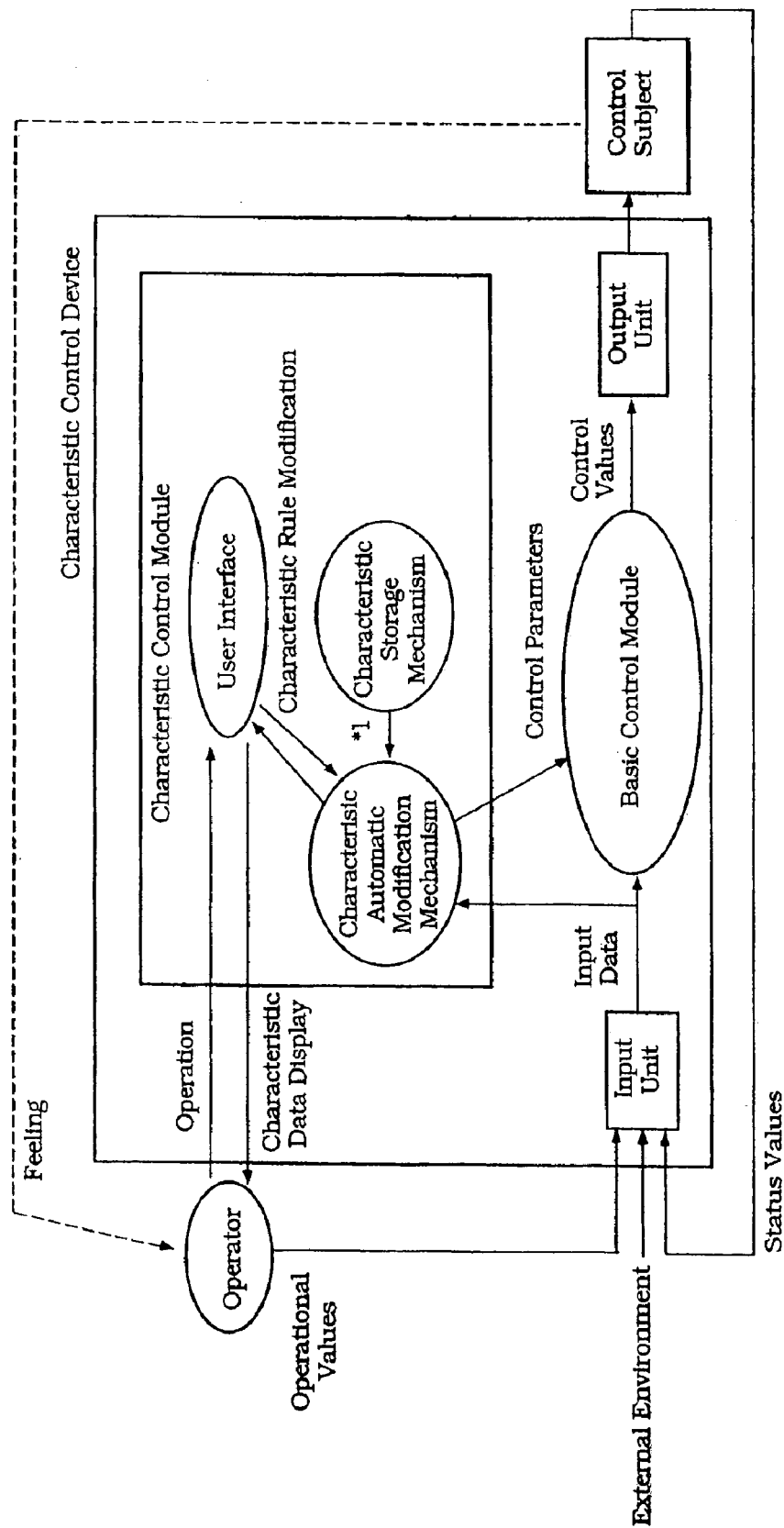
FIG. 1 is a schematic block diagram of a control device provided with a characteristic control device in accordance with a first embodiment of the present invention.

FIG. 1 is a schematic block diagram of a control device that is provided with a characteristic control device in accordance with the present invention. As shown in the figure, this control device is provided with a basic control module which calculates control amounts for the control subject based on input data inputted via an input unit (amount of operation of the user, data obtained from the external environment, the state of the control subject as obtained from the control subject, and the like), and which controls the control subject via an output unit, a characteristic storage mechanism which stores a plurality of types of basic control parameters, a characteristic automatic modification mechanism which automatically determines the output ratio of a plurality of basic control parameters stored in the characteristic storage mechanism in accordance with predetermined input data, and which calculates control parameters to be applied to the basic control module based on the output ratio determined, and a user interface which serves to display the characteristic modification conditions in the characteristic automatic modification mechanism to the user, and to manipulate the characteristic modification conditions.

A plurality of basic control parameters, and control data corresponding thereto, are stored in advance in the characteristic storage mechanism.

It is possible to construct the "characteristic data" by adding appropriate arbitrary data to the conditions of use of the control subject in accordance with each basic control parameter. Concretely, for example, when certain basic control parameters are the basic control parameters when the travel characteristics of the two-wheeled vehicle which is the control subject are in an accelerating state, then the characteristic data are "accelerating characteristics" or "accelerating characteristics plus the level thereof" (for example, acceleration state: low, medium, high). Additionally, the identification of the user (for example, Mr. A or Mr. B or the like), the physical condition of the user (for example, the body temperature or pulse rate or the like), the level of skill of the user (for example, the amount of time from the obtaining of a driver's license to the present), or the environment of use of the control subject (for example, the weather, the place, or the time or the like) may be added thereto. By means of this, detailed data result, such as, for example, "Mr. A, body temperature of x°, pulse rate of x, fair weather, acceleration state: low."

The characteristic storage mechanism is capable of storing the basic control parameters by increasing the number of maps in accordance with the data comprising the characteristic data. Concretely, a plurality of maps relating to the travel characteristics may be employed in accordance with the classification of the users, or a plurality of maps relating to the travel characteristics may be employed in accordance with the weather, and the basic control parameters may be stored.

Next, the structure of the characteristic automatic modification mechanism will be briefly discussed.

The characteristic automatic modification mechanism calculates, at a pre-established timing, the control parameters to be applied to the basic control module from a plurality of basic control parameters stored in the characteristic storage mechanism, and modifies the control parameters of the basic control module. Examples of the predetermined timing include, for example, changes in the conditions of the use, or pre-established control cycles or the like.

Figure 2:
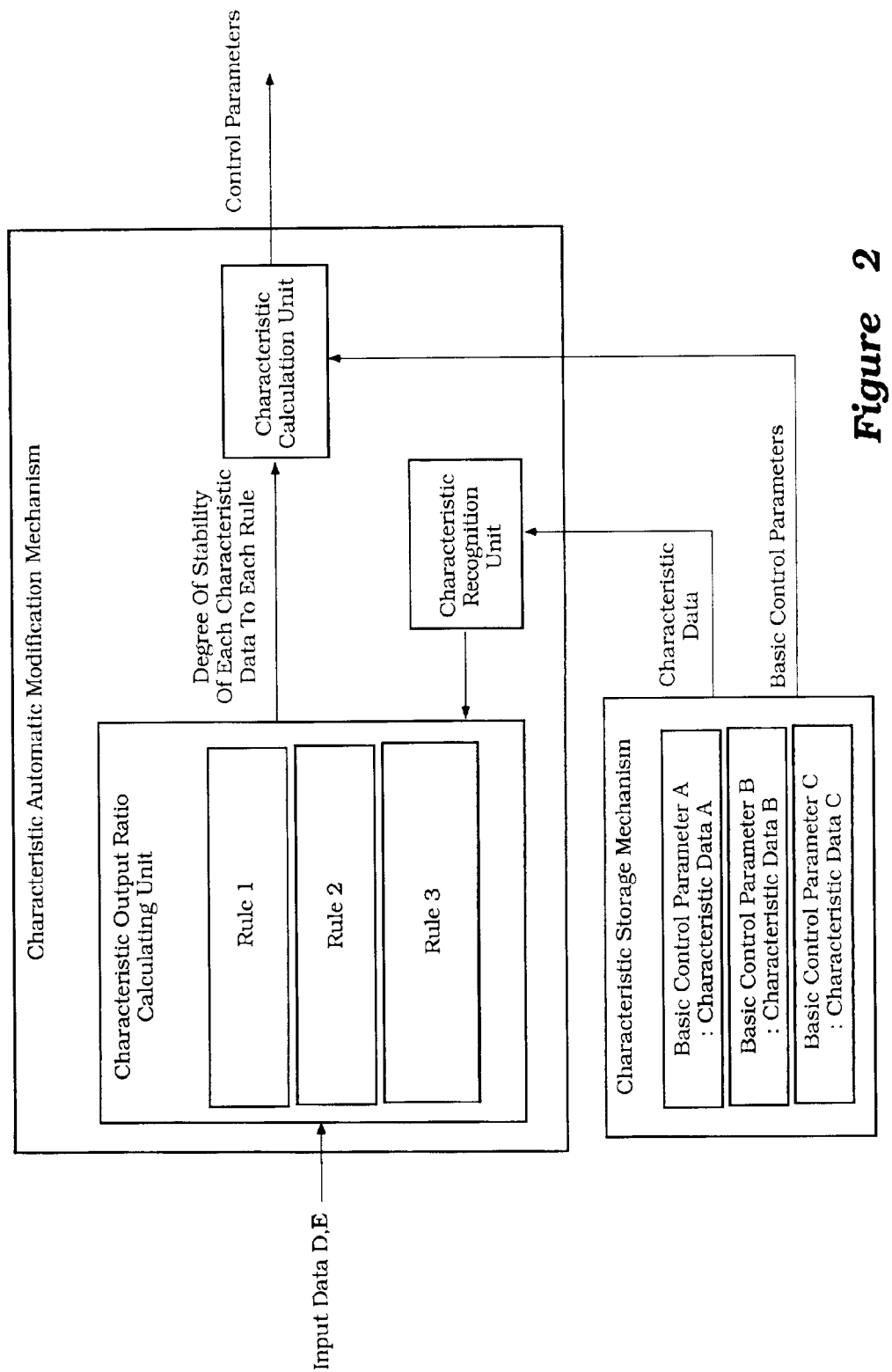
FIG. 2 is a schematic block diagram of a characteristic automatic modification mechanism.

FIG. 2 is a schematic block diagram showing the structure of the characteristic automatic modification mechanism.

As shown in FIG. 2, the characteristic automatic modification mechanism is provided with a characteristic recognition unit, a characteristic output ratio determining unit, and a characteristic calculation unit.

The characteristic output ratio determining unit relates to the input data to the characteristic data of each basic control module, and is provided with fuzzy rules, parameters (arithmetical formulae) or maps or the like which permit the determination of the output ratio of each basic control module from the input data.

To take as an example the provision of fuzzy rules in the characteristic output ratio determining unit, the characteristic output ratio determining unit determines the current characteristics of the control subject obtained from the input data using the antecedent part of an if/then proposition in a programming language, while the output ratio of each basic control parameter is determined in accordance with the condition of the antecedent part by the conclusion of the proposition.

Concretely, when there are three basic control parameters, and three characteristic data corresponding thereto (characteristic data A, characteristic data B, and characteristic data C) and two types of input data (input D, input E) are inputted into the characteristic output ratio determining unit, then it is possible to determine the rules as given below.

Fuzzy Rule Example 1

"If input D is large and input E is small, then the degree of appropriateness (of the current characteristics) with respect to the characteristic data A is high."

"If input E is small, then the degree of compatibility (of the current characteristics) with respect to characteristic data B is low."

"If input D is small, and input E is large, then the degree of compatibility (of the current characteristics) with respect to the characteristic data is high."

Then, the degree of compatibility with respect to each characteristic data determined in this manner is outputted to the characteristic calculation unit as the output ratio of the basic control parameters with respect to each characteristic data.

When the fuzzy rules are constructed as given above, then the degree of compatibility of the current characteristics (that is to say, the input data) with respect to each characteristic data changes in accordance with modifications in the boundary used to determine whether the input is "large" or "small" in the antecedent part.

Accordingly, when the characteristic data includes, for example, data relating to the type of user or weather or the like, rules are prepared for the modification of the position of this boundary in the antecedent part for each user for each type of weather, and based on the information obtained from the characteristic recognition unit, the appropriate rules may be employed.

Furthermore, as described above, the characteristic output ratio determining unit is made up of a plurality of fuzzy rules, and thereby, it is capable of smoothly conducting changes in characteristics.

The characteristic calculation unit calculates values for each basic control parameter from the maps of the characteristic storage means based on data relating to the status values contained in the input data, and calculates and outputs the control parameter values to be applied to the basic control modules based on each calculated basic control parameter value and the output ratio calculated by the characteristic output ratio determining unit. Concretely, for example, when the characteristic output ratio determining unit comprises fuzzy rules as described above, the control parameters to be applied to the basic control modules are calculated in the characteristic calculation unit by a weighted average of the degree of compatibility of each basic control parameter.

As described above, in the characteristic automatic modification mechanism, a relationship is established between the input data (for example, the current characteristics) and the characteristic data. For this reason, the type of input data applied to the characteristic automatic modification mechanism is determined in accordance with the type of data comprising the characteristic data of each basic control parameter stored in the characteristic storage mechanism.

Accordingly, by combining the types of data comprising the characteristic data, it is possible to automatically modify the output ratio of the basic control parameters. This combination may be arbitrarily determined; examples thereof are the methods described hereinbelow.

(A) A method in which the output ratio of the basic control parameters prepared in accordance with the preferences of a user is changed in accordance with the conditions of use.

(B) A method in which the output ratio of the basic control parameters prepared in accordance with the preferences of a user is changed in accordance with bodily condition.

(C) A method in which the output ratio of the basic control parameters prepared in accordance with the preferences of a different user is changed in accordance with a user.

(D) A method in which the output ratio of the basic control parameters prepared in accordance with the skill level of a different user is changed in accordance with a user.

(E) A method in which the output ratio of the basic control parameters prepared in accordance with the conditions of use is changed in accordance with the conditions of use.

(F) A method in which the output ratio of the basic control parameters prepared in accordance with the bodily condition of a user is changed in accordance with that bodily condition.

When method (A) above is applied, the characteristic storage mechanism stores basic control parameters corresponding to the preferences of a user, and data expressing the state of use of the control subject are established as characteristic data for each of the basic control parameters, while the characteristic automatic modification mechanism accepts, as input data, data which may be related to data expressing the conditions of use of the control subject, and relates the two to one another. Concretely, where the control subject is a two-wheeled vehicle, and the data expressing the condition of use thereof are travel characteristics (for example, travel characteristics: high speed travel), the characteristic automatic modification mechanism is capable of using, as the data which may be related to the travel characteristics, the vehicle speed and rate of change in degree of throttle opening as input data, and conducts the relating of these to one another by means of fuzzy rules, functions, or maps or the like.

Furthermore, when method (B) is employed, the characteristic storage mechanism stores basic control parameters corresponding to the preferences of a user, and data expressing the bodily condition of a user (for example "acceleration characteristics: low/body temperature x°/pulse rate x") added to the conditions of use of the control subject are established as the characteristic data for each of the basic control parameters, and the characteristic automatic modification mechanism employs data which may be related to the data expressing the conditions of use of the control subject and data expressing the subject of the user as input data, and relates these to one another. The data expressing the bodily condition of the user are not limited to the bodily temperature and pulse rate described above, but may employ the amount of perspiration or other data as well. Furthermore, the data expressing this bodily condition may be detected by means of various sensors, and the detected values may be employed as the input data in the characteristic automatic modification mechanism.

Furthermore, when method (C) above is employed, the characteristic storage mechanism stores basic control parameters corresponding to the preferences of a user, and in addition to data expressing the conditions of use of the control subject, data expressing the user's identification (for example, "travel characteristics: low acceleration/Taro Yamaha") are established as the characteristic data for each of the basic control parameters, and the characteristic automatic modification mechanism uses, as input data, data which may be related to data expressing the conditions of use of the control subject and data expressing the user's identification and these are related to one another. Concretely, the user identification may be recognized from the pattern of operation of the user, or alternatively, characteristic values of the user (such as, for example, the fingerprint, the iris, or the like) may be sensed, and the detected values may be used to determine the user, or alternatively, determination may be conducted by the direct input of an identification code by the user.

Additionally, when method (D) above is employed, the characteristic storage mechanism stores basic control parameters corresponding to the preferences of a user, and in addition to data expressing the conditions of use of the control subject, data expressing the identification of the user (for example, "travel characteristics: low acceleration/Taro Yamaha") are established as the characteristic data for each of the basic control parameters, and the characteristic automatic modification mechanism employs, as input data, data which may be related to data expressing the conditions of use of the control subject and data expressing the identification of the user and relates these to one another.

Furthermore, when method (E) above is employed, the characteristic storage mechanism stores basic control parameters corresponding to the preferences of a user, and data expressing the conditions of use of the control subject are established as the characteristic data for each of the basic control parameters, and the characteristic automatic modification mechanism employs, as input data, data which may be related to data expressing the conditions of use of the control subject and relates these.

Furthermore, when the method (F) described above is employed, the characteristic storage mechanism stores basic control parameters corresponding to the preferences of a user, and in addition to the conditions of use of the control subject, data expressing the bodily condition of the user (for example, "acceleration characteristics/body temperature x°/pulse rate x") are established as the characteristic data for each of the basic control parameters, and the characteristic automatic modification mechanism employs, as input data, data which may be related to the data expressing the conditions of use of the control subject and data expressing the bodily condition of the user, and relates these to one another.

The user interface is provided with a display mechanism that displays to a user the characteristic modification conditions in the characteristic automatic modification mechanism, and, when the characteristic automatic modification mechanism modifies the characteristics using fuzzy rules, the display mechanism displays those fuzzy rules. This display mechanism may also be used as a user interface that allows the manipulation of characteristic modification conditions (for example, fuzzy rules) in the characteristic automatic modification mechanism. The concrete structure of this user interface will be explained in detail in the explanation of the concrete embodiments herein below.

Furthermore, in the explanation above, the characteristic control device was explained using an example in which it was incorporated into a control device provided with a basic control module; however, the characteristic control device may be constructed separately from a control device which is provided with a basic control module.

Figure 3:
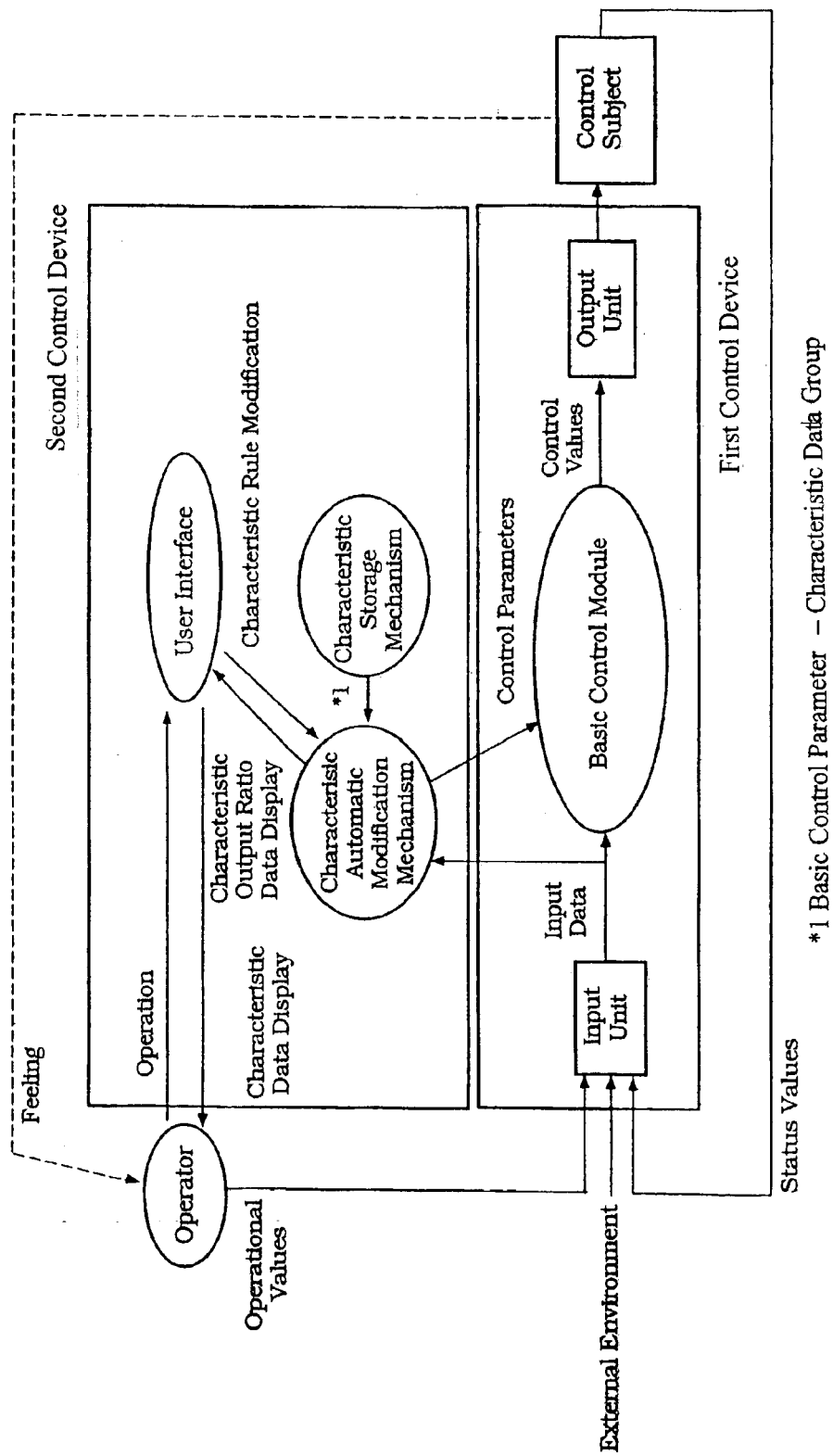
FIG. 3 is a block diagram showing an example of a structure in which the characteristic control device and the control device provided with the basic control module are provided separately.

FIG. 3 is a schematic block diagram in which a control device provided with a basic control module is made a first control device which is incorporated into a control subject, while the characteristic control device is made a second control device, and these are separately provided.

As shown in the figure, the first control device is provided with a basic control module which calculates the control values of the control subject based on the input data inputted via the input unit (the operation values of the user, data obtained from the external environment, status values of the control subject obtained from the control subject, and the like) and controls the control subject via the output unit.

Furthermore, the second control device is provided with a characteristic storage mechanism which stores a plurality of types of basic control parameters, a characteristic automatic modification mechanism, which automatically determines the output ratio of the plurality of basic control parameters stored in the characteristic storage mechanism in accordance with predetermined input data, and calculates control parameters to be applied to the basic control module based on the output ratio that is determined, and a user interface which serves to display the characteristic modification conditions in the characteristic automatic modification mechanism to the user, and to manipulate the characteristic modification conditions.

The processing mechanisms provided in the first control device and the second control device are the same as those in the embodiment shown in FIG. 1 and described above, so that a detailed explanation is omitted here.

Almost all of the control devices provided with basic control modules are incorporated into the product that is the subject of control. Accordingly, by means of providing the characteristic control device as a separate structure in this way, it is possible to conduct complex calculation processing with the characteristic control device, so that it is possible to simplify the control device which is incorporated into the control subject, and it is thus possible to reduce the cost of the product itself.

Figure 4:
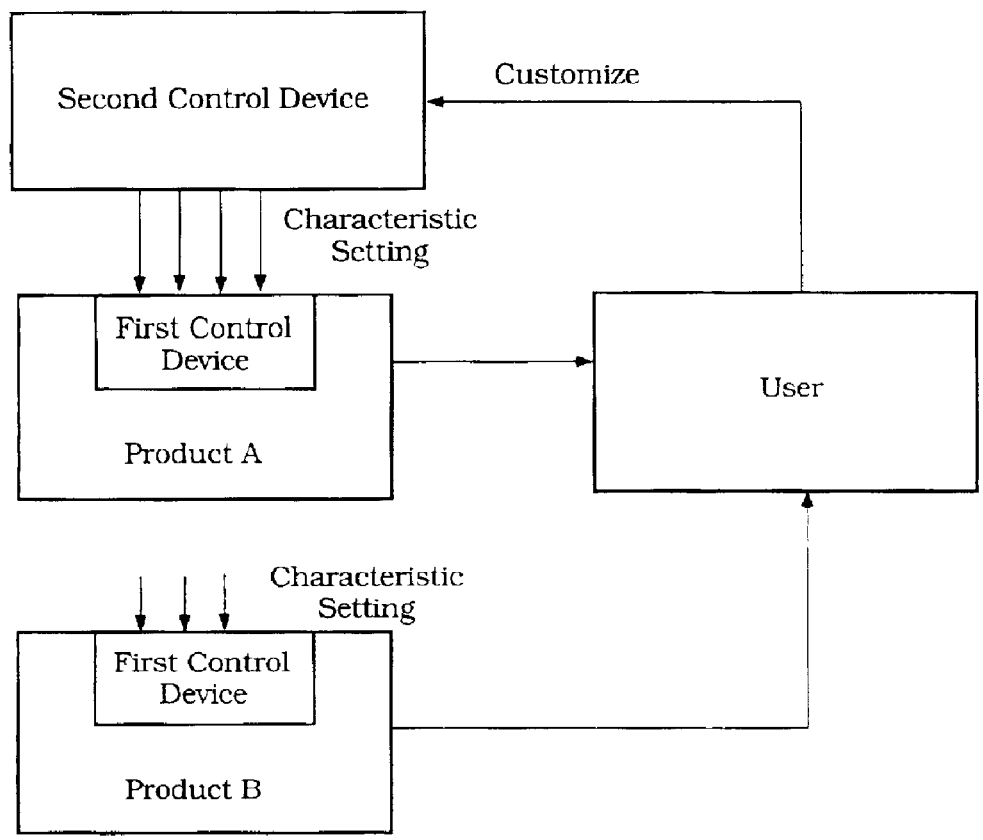
FIG. 4 is a schematic of a structure in which a control device which is provided with a basic control module is used as a first control device incorporated in the control subject, and this is separately provided from the characteristic control device, which is a second control device.

Furthermore, as shown in FIG. 4, when a user possesses a plurality of products, while one product is being used, there are cases in which other products are not being used. For example, when a user possesses two two-wheeled vehicles, or when a user possesses a two-wheeled vehicle and an automobile, while one is being used, the other is not being used. In such cases, by making the characteristic control device a separate structure, the characteristics of a plurality of control subjects may be customized, and control thereof may be conducted, using a single characteristic control device, so that it is not necessary to possess separate characteristic control devices for each of a plurality of control subjects, and this has the effect of avoiding waste.

Furthermore, by constructing the characteristic control device as a separate structure, restrictions on the manufacture of the characteristic control device are eliminated, so that it is possible to employ a standard computer as the characteristic control device.

If a standard computer may be employed as the characteristic control device in this manner, it is not necessary for the user to master the operations of the various products, and it becomes possible to conduct customization and control of the characteristics of a variety of products using a single set of operations on a computer the user is used to employing. Furthermore, this has the effect of making it possible to modify either the product that is the subject of control or the characteristic control device by itself. This is extremely effective with respect to products having different life cycles, such as motor-driven vehicles and computers.

Furthermore, when the characteristic control device is separately provided, the characteristic control device may be structured so as to be attachable to and detachable from the control device which is provided with the basic control module, and may be structured so as to be operable irrespective of whether it is attached or detached. Furthermore, in this case, a wireless interface may be employed between the characteristic control device and the control device in order to simplify the attachment and detachment of the characteristic control device.

Figure 5:
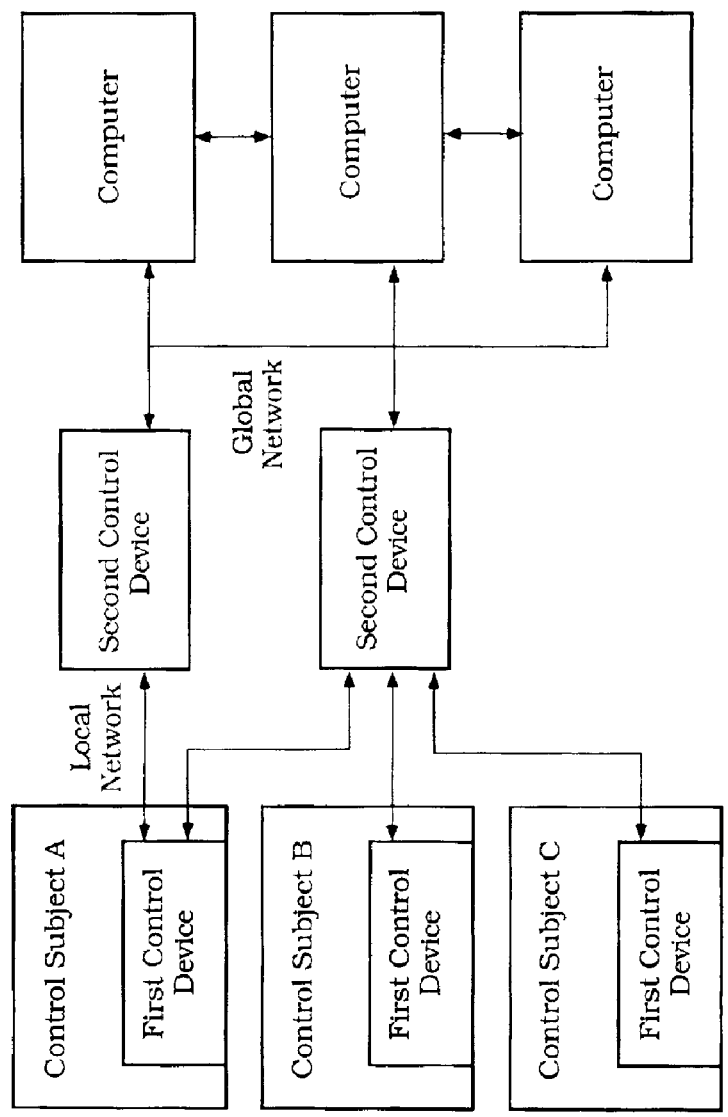
FIG. 5 is a schematic showing the situation in which the characteristic control device is connected to a network.

Furthermore, in this case, the modification of the characteristics of the basic control module may be carried out by the characteristic control device alone; however, as shown in FIG. 5, communication is also possible with other computers via a network. By doing this, it becomes possible to obtain and transmit a variety of characteristic data via the network, and it also becomes possible to obtain data relating to various conditions of use such as positional data or weather data or the like.

Furthermore, when the characteristic control device is structured as a separate computer in this way, and this computer is connected to a network, it is possible that the computer functioning as the characteristic control device may have the function of a firewall. By means of this, a structure becomes possible in which wide-ranging access may be had to the global network and various types of data communication may be carried out therewith, while the local network communicates only that data necessary for control at a high security level, so that it becomes possible to build a system which is highly functional and which has a high level of reliability. Furthermore, this has the advantage that, even when connection with possible to a network that is geographically and environmentally global, the characteristics of the basic control module may be modified only by the local network.

The global network described above may employ the Internet, and if the control subject has an interface that permits direct connection to the Internet, the local network may also employ the Internet.

Furthermore, when the characteristic control device is structured so as to be separate from the control device having the basic control module, it is advisable to provide a failsafe with the aim of protecting the basic control module side in cases in which, for example, compensation is made for errors in communication, or the calculated values of the characteristic control device are outside the permissible ranges for the control subject.

Furthermore, it is possible to provide a display mechanism that converts the characteristic values of the characteristics to a screen and displays them when the characteristics are modified by the characteristic modifying mechanism, thus facilitating an evaluation of the characteristics.

The characteristic control device of the present invention was described above using a general example in which a control subject was not specified; however, hereinbelow in a more concrete example in which the control subject is specified, an example will be explained in which the characteristic control device is applied to a travel characteristic control device for two-wheeled vehicles.

An electric throttle has a throttle valve for controlling the engine air intake which is driven by a motor in response to accelerator operational values which are inputted by an operator, and by controlling the characteristics of this electric throttle, it is possible to affect the drive feeling characteristics of the vehicle.

The characteristics of an electric throttle that may be modified include static characteristics and dynamic characteristics.

Figure 6:
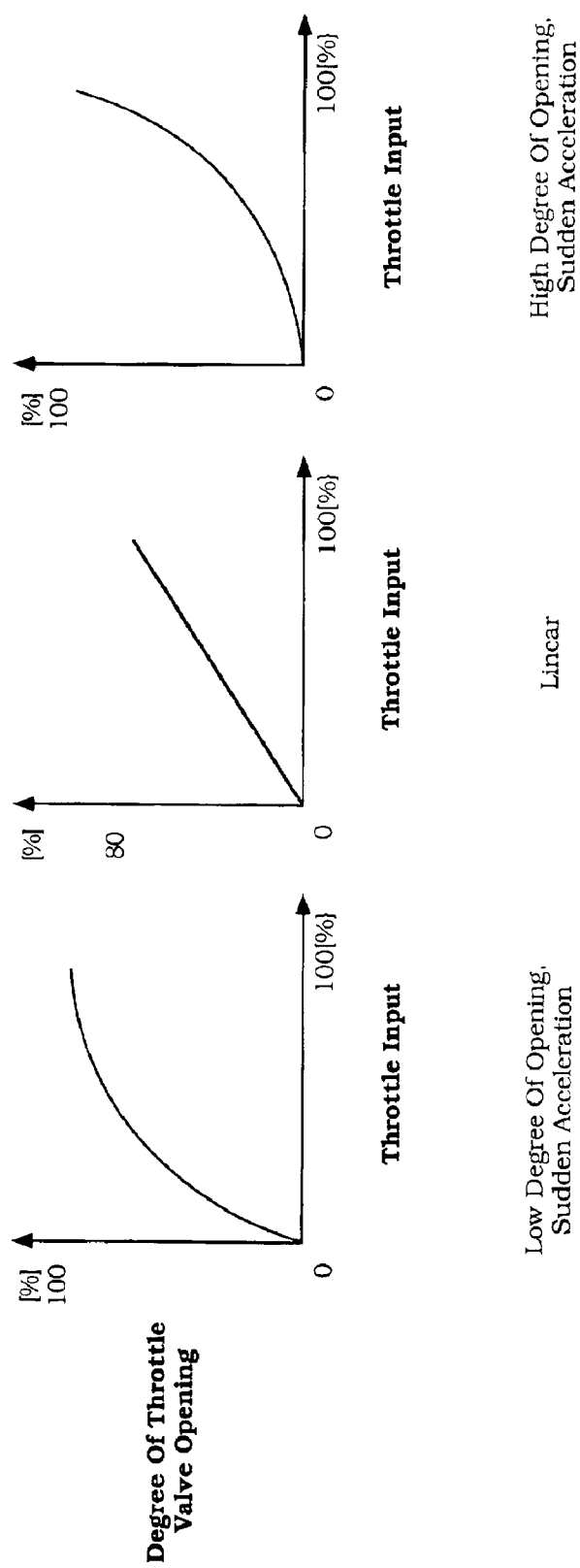
FIG. 6 is a graph showing examples of distinctive static characteristics.

Static characteristics include the degree of opening of the throttle valve when the throttle input is constant, which affects the constant travel characteristics of the vehicle. A number of distinctive characteristics are shown in FIG. 6. The static characteristics may employ any type of function insofar as the throttle valve output is zero when the throttle input is zero. By changing the static characteristics of the throttle opening in this way, it is possible to output different degrees of throttle valve opening in response to the same throttle input.

Figure 7:
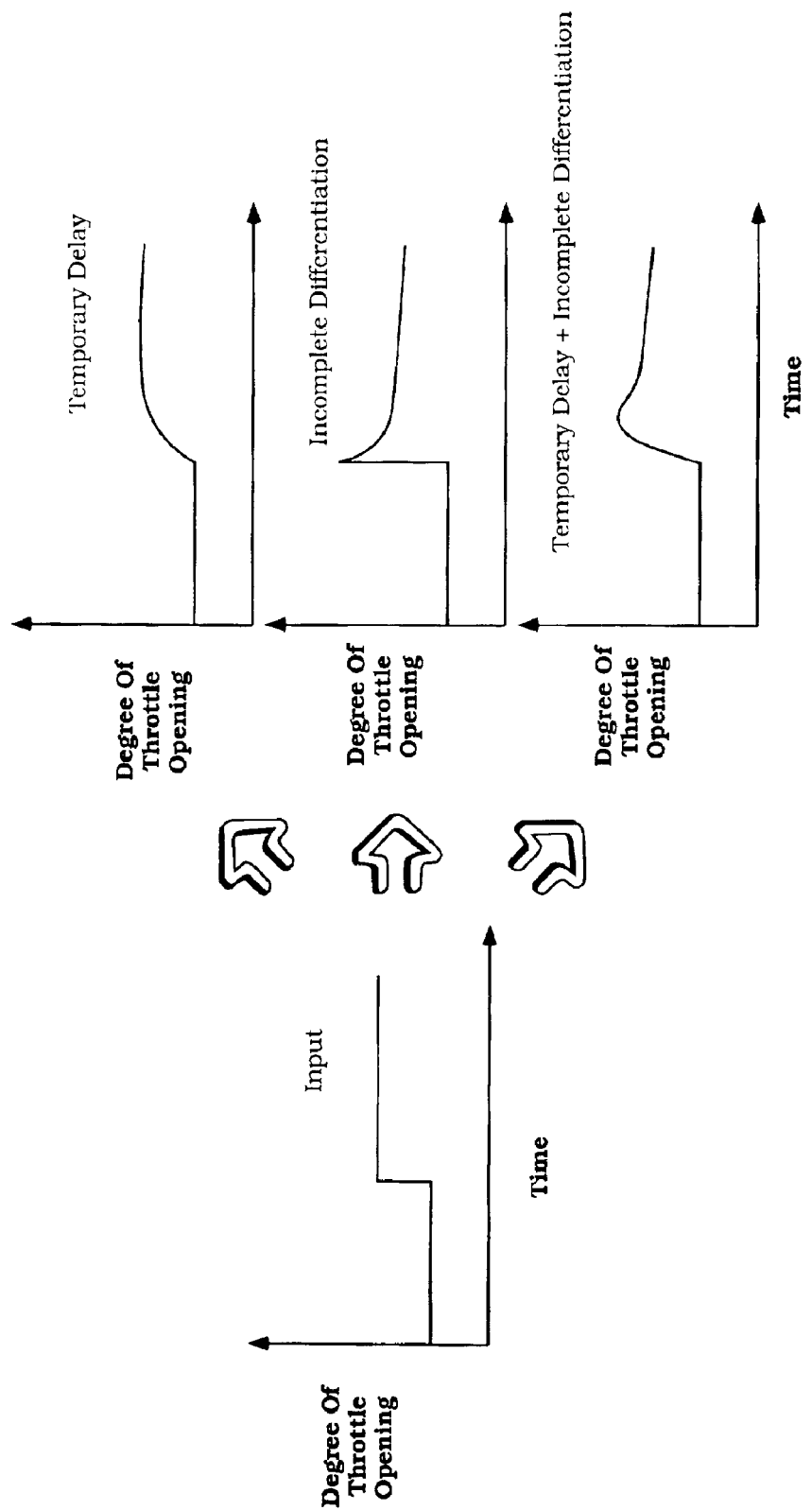
FIG. 7 shows the relationship between the throttle input and the throttle valve output when the motion characteristics are modified.

The dynamic characteristics are related to the degree of change in the degree of opening of the throttle valve in response to changes in the throttle input, and affect the transient characteristics of the vehicle. Concretely, a temporary delay filter and incomplete differential filter are combined, and the parameters of these are modified. The relationship between the throttle input and the throttle valve output when the dynamic characteristics are modified is shown in FIG. 7.

Figure 8:
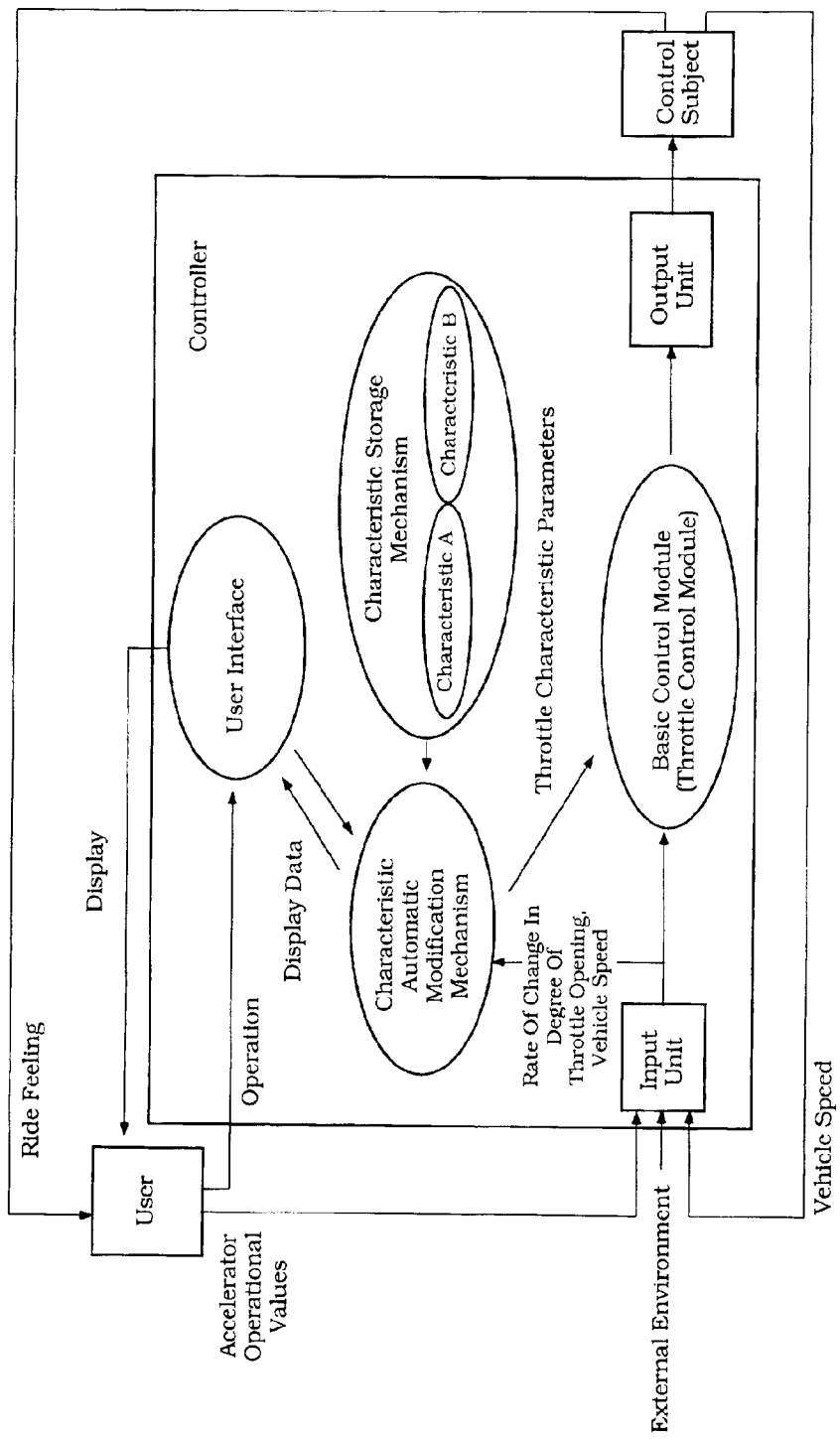
FIG. 8 is a schematic block diagram of a travel characteristic control device for two-wheeled vehicles to which the characteristic control device is applied.

FIG. 8 is a schematic block diagram of a travel characteristic control device for two-wheeled vehicles to which the characteristic control device is applied. As shown in the figure, this travel characteristic control device is provided with a throttle control module which determines the control output of the throttle valve using throttle control parameters, a characteristic storage mechanism, and a characteristic automatic modification mechanism.

Figure 9:
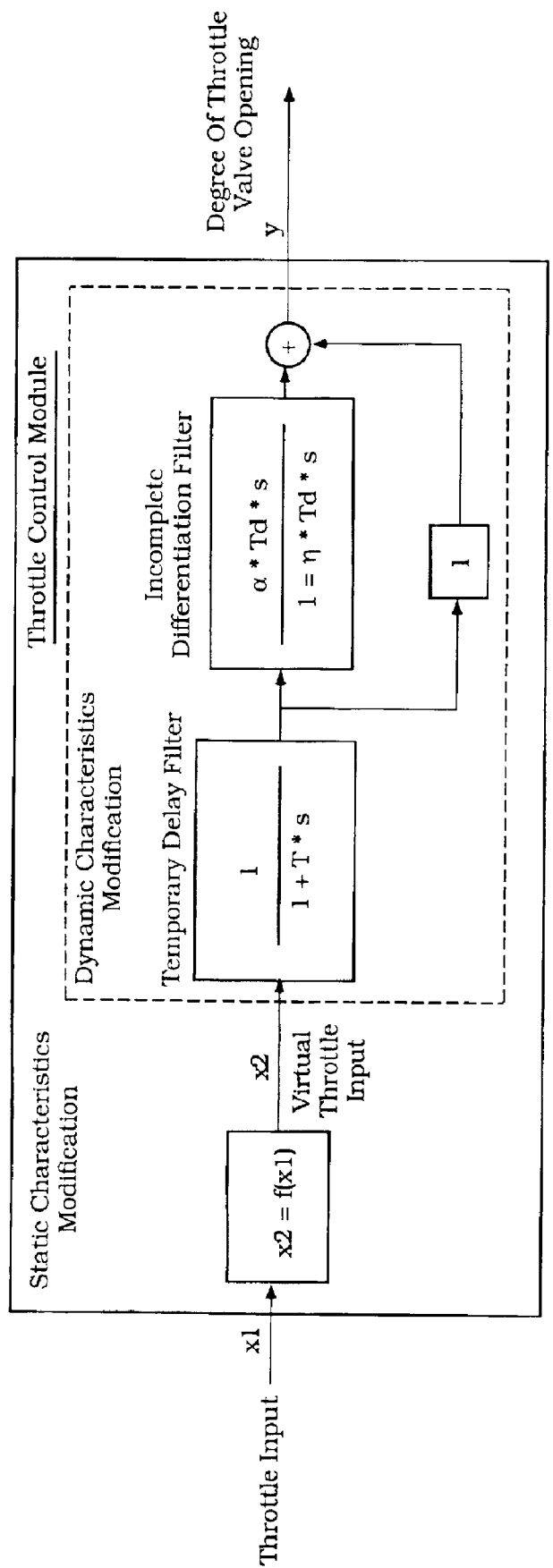
FIG. 9 is a schematic block diagram of a throttle control module.

The throttle control module determines the degree of opening of the throttle valve from the throttle input based on the throttle characteristic parameters. In this module, the static characteristics and the dynamic characteristics of the throttle are simultaneously altered. A block diagram of the throttle control module is shown in FIG. 9. As shown in the figure, this static control module is provided with a static characteristic modification unit and a dynamic characteristic modification unit; the static characteristic modification unit converts the throttle input into a virtual throttle input, while the dynamic characteristic modification unit determines the degree of opening of the throttle valve from the virtual throttle input. In this embodiment, low opening static characteristics, high opening static characteristics, temporary delay time constants, and differential gain are employed as the characteristic parameters.

Figure 10:
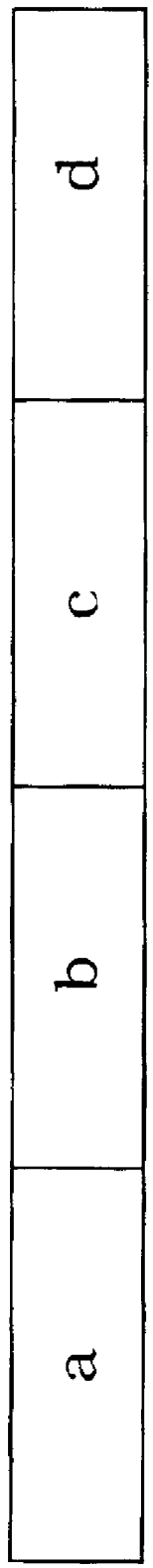
FIG. 10 shows an example of a genetic coding method when a genetic algorithm is employed.

A plurality of types of basic throttle characteristic parameters, which determine the travel characteristics in advance, are stored in the characteristic storage mechanism together with characteristic data. A schematic diagram of the basic throttle characteristic parameters stored in the characteristic storage mechanism is shown in FIG. 10. In the figure, references a and b indicate parameters which relate to a static characteristic function f(x), c indicates a differential time Td which is related to the dynamic characteristics, and reference d indicates a temporary delay time constant T which is related to the dynamic characteristics.

In the present embodiment, the characteristic data are data which relate to "travel characteristics," and data relating to the travel characteristics are attached to each of the characteristic data, such as, for example, "travel characteristics: high speed travel characteristics," "travel characteristics: low speed travel characteristics," "travel characteristics: winding travel characteristics," and "travel characteristics: accelerating travel," and the like.

Figure 11:
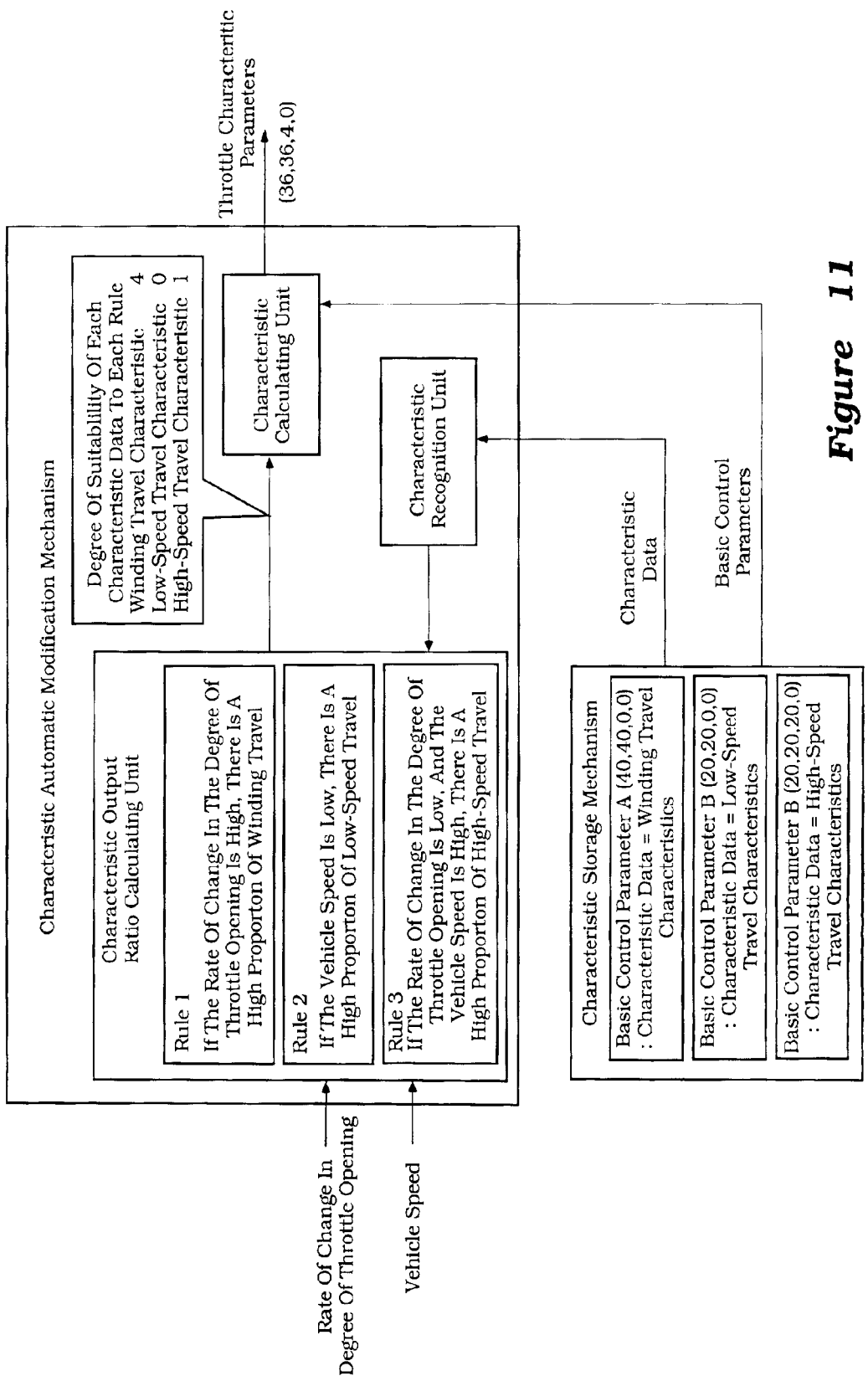
FIG. 11 is a schematic block diagram of a characteristic automatic modification mechanism.

Next, the characteristic automatic modification mechanism will be explained. FIG. 11 is a block diagram showing the characteristic automatic modification mechanism. As shown in FIG. 11, the characteristic automatic modification mechanism is provided with a characteristic recognition unit, a characteristic output ratio determining unit, and a characteristic calculation unit.

The characteristic output ratio determining unit relates the input data with the characteristic data of each basic control module, and has fuzzy rules which are structured so as to permit an output ratio of each basic control module to determine from the input data.

Concretely, for example, if the following are stored in the characteristic storage mechanism:
basic control parameter A: characteristic data (travel characteristics:winding travel characteristics),
basic control parameter B: characteristic data (travel characteristics:low speed travel characteristics),
basic control parameter C: characteristic data (travel characteristics:high speed travel characteristics),
then the input data into the characteristic output ratio determining unit are the rate of change in the throttle and the vehicle speed, and the fuzzy rules in the characteristic output ratio determining unit may be established as given below.

Rule 1: "If the throttle rate of change is high, the proportion of winding travel is high."

Rule 2: "If the rate of speed is low, the proportion of low speed travel is high."

Rule 3: "If the rate of change in the throttle is low, and the speed is high, then the proportion of high speed travel is high."

In the characteristic output ratio determining unit, the degree of suitability of the current characteristics with respect to the characteristic data is determined using the fuzzy rules described above, and this is outputted to the characteristic calculation unit.

The characteristic calculation unit calculates the values of each basic control parameter A, B, and C from the map in the characteristic storage mechanism based on data relating to the status values contained within the input data, and using the degree of suitability with respect to each characteristic datum inputted from the characteristic output ratio determining unit, a weighted average of the degree of suitability of each basic control parameter value is calculated, and this value is outputted as the throttle characteristic parameter which is to be applied to the basic control module.

Concretely, as shown in FIG. 11, if, for example, the values of the basic control parameter A (winding travel characteristic) stored in the characteristic storage mechanism are (40, 40, 0, 0), the values of the basic control parameter B (low speed travel characteristic) are (20, 20, 0, 0), the values of the basic control parameter C (high speed travel characteristic) are (20, 20, 20, 0), and the degree of compatibility of each characteristic data with respect to each rule obtained from the characteristic output ratio determining unit is winding characteristic: 4, low speed characteristic: 0, and high speed travel characteristic: 1, then the values of the throttle characteristic parameter outputted from the characteristic calculating unit are (36, 36, 4, 0).

Next, the user interface will be explained in detail.

Figure 12:
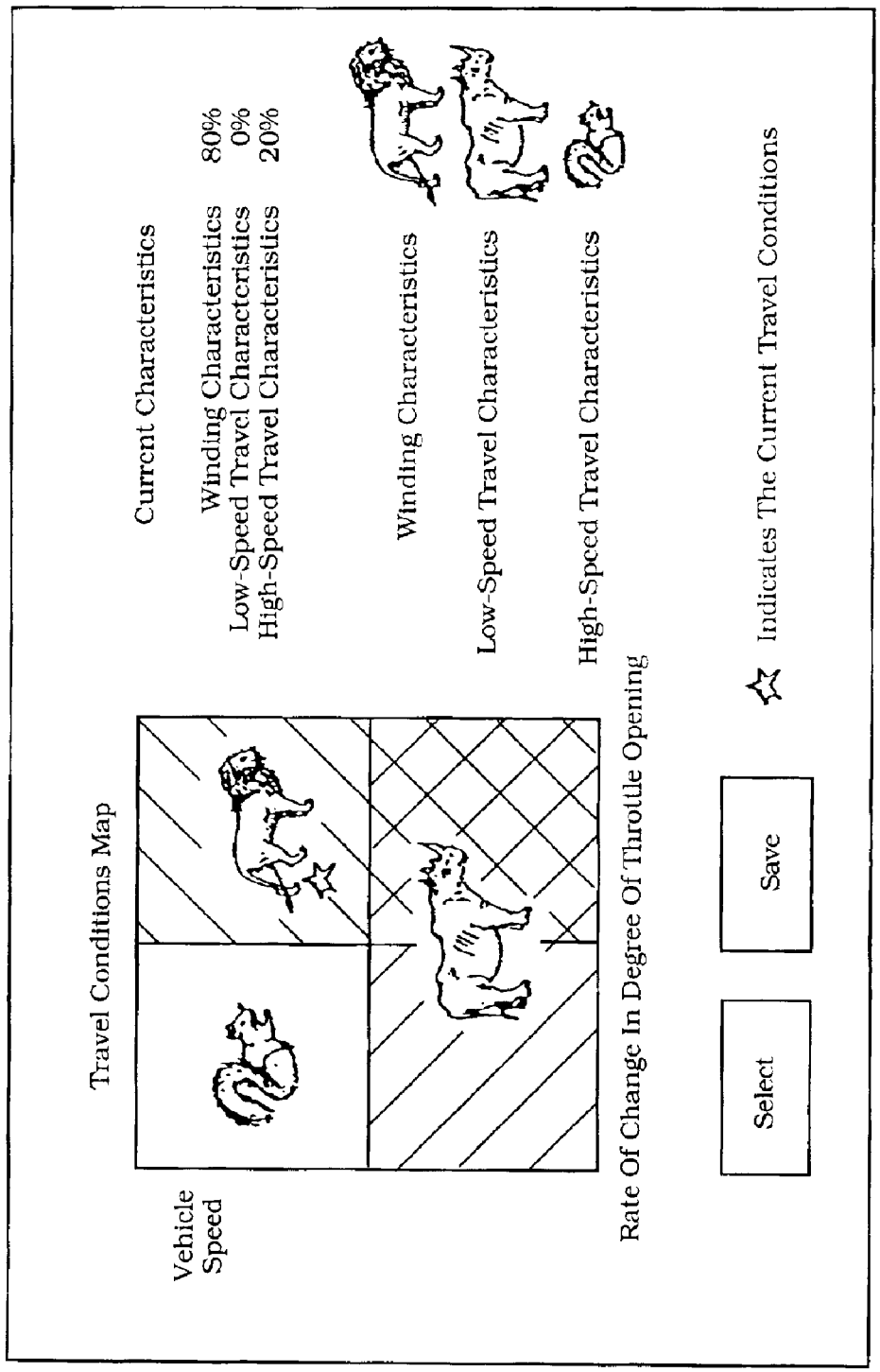
FIG. 12 shows an example of a user interface.

FIG. 12 shows an example of a user interface that displays the rules described above in the form of a map. In the figure, the "lion" character corresponds to the characteristic data of basic control parameter A, the "squirrel" character corresponds to the characteristic data of basic control parameter B, and the "rhinoceros" character corresponds to the characteristic data of basic control parameter C. Furthermore, the values of the boundary lines determining the regions of each character serve as the boundaries between viewing the values of the input data as "large" or "small" in the antecedent part of the fuzzy rules. Additionally, the star indicates the position of the current characteristics obtained from the input data. In this way, using images of displayed things (lion, squirrel, rhinoceros) which enable a direct perception of the basic control parameter characteristics, the relationship between the fuzzy rules and the current characteristics is mapped and displayed to the user, and thereby it is possible for the user to visually and directly confirm the modification of the characteristics and the current position of the characteristics.

This user interface is structured so as to permit the arbitrary modification of the position of the boundary lines delineating the regions of each character, or the position of the characters themselves, by dragging. By means of this, the user may freely adjust the antecedent part of the fuzzy rules. By means of modifying the position of the characters themselves, it is possible to modify the central position of the assignment of the characteristics, and furthermore, by determining the position of the boundary lines delineating the regions of the characters, it is possible to modify the scope of the assignment of the characteristics.

Furthermore, it is also possible for the user to carry out the initial setting of the characteristic modification conditions of the automatic modification mechanism using this user interface.

An example of the procedure a user follows to conduct this initial setting via the user interface is given below.

1. One characteristic is selected from the collection of throttle basic characteristic parameters using the selection button, and this throttle basic characteristic parameter is applied to the basic control module, and control of the control subject is carried out, and the feeling thereof is assessed.

2. Step #1 is repeated until a desired characteristic is found.

3. The desired characteristic is assigned on the travel condition map using the save button. By means of this, the relationship between the conditions of use and the basic control parameters is set in the characteristic automatic modification mechanism. The central position of the assignment is determined by the average value of the travel condition data when travel is conducted using this characteristic, and the scope of the assignment is determined by the dispersion of the travel condition data when travel is conducted using this characteristic.

4. The travel conditions are changed, and if this characteristic is not desirable at this time, the steps of 1–3 are repeated.

5. If fine adjustment of the characteristic assignment is required, modification is conducted by directly manipulating the travel condition map.

Furthermore, the initial setting of the characteristic modification conditions of the automatic modification mechanism may also be conducted automatically using the user interface.

An example of the process by which the initial setting is automatically conducted using the user interface is given herein below.

1. One characteristic is selected from the collection of throttle basic characteristic parameters using the selection button, and this throttle basic characteristic parameter is applied to the basic control module, and control of the control subject is carried out, and the feeling thereof is assessed.

2. Step #1 is repeated until a desired characteristic is found.

3. The user conducts travel using the characteristic desired at this time until the travel conditions change. The system assigns the characteristic during travel onto the travel condition map at regular intervals. The central position of the assignment is determined by the average value of the travel condition data during travel using this condition, and the scope of the assignment is determined by the dispersion of the travel conditions during travel using this characteristic.

4. The travel conditions are changed, and if this characteristic is not desirable at this time, the steps of 1–3 are repeated.

5. If fine adjustment of the characteristic assignment is required, modification is conducted by directly manipulating the travel condition map.

Figure 13:
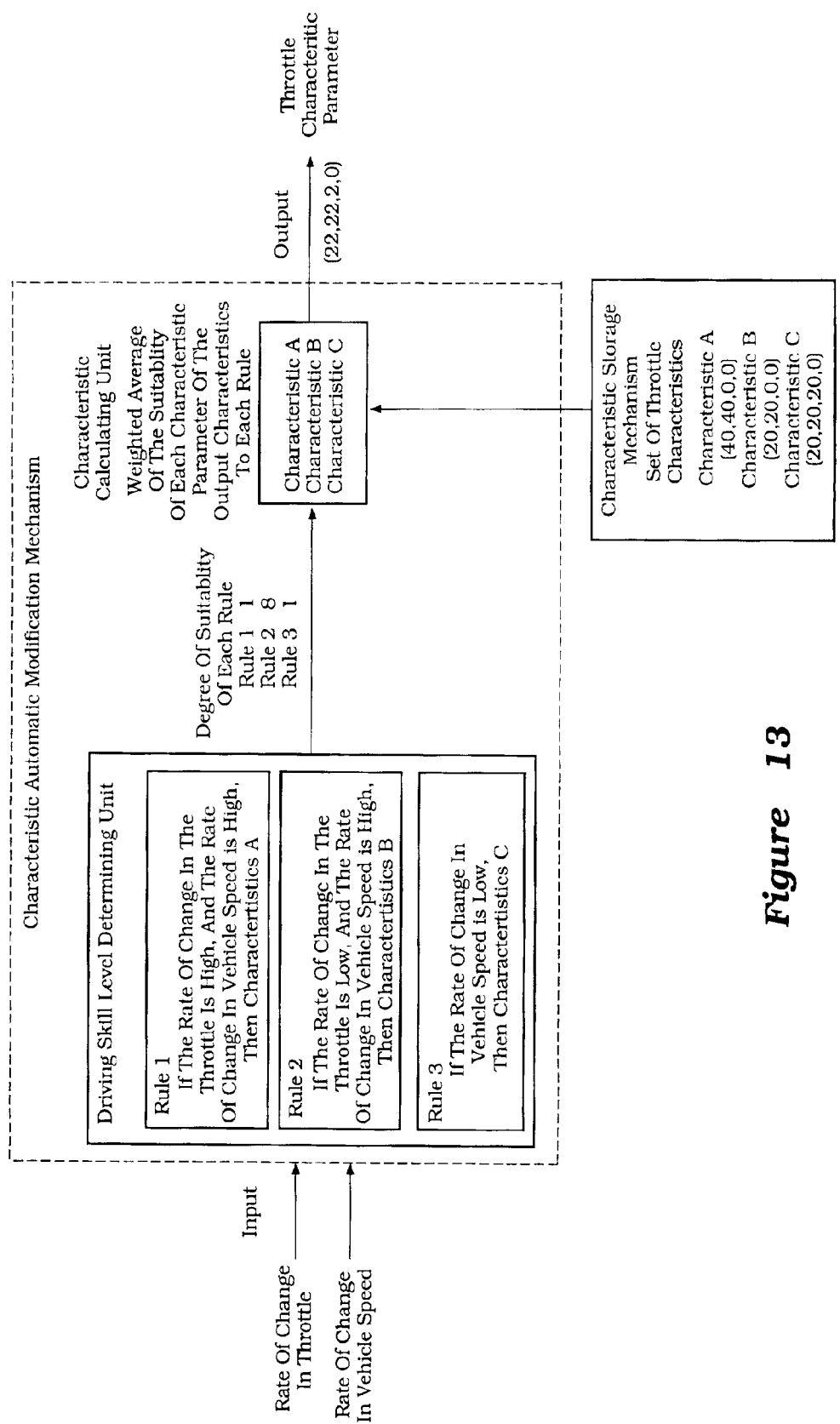
FIG. 13 is a schematic block diagram showing an example of the structure of a characteristic automatic modification mechanism that responds to the level of skill.
Figure 14:
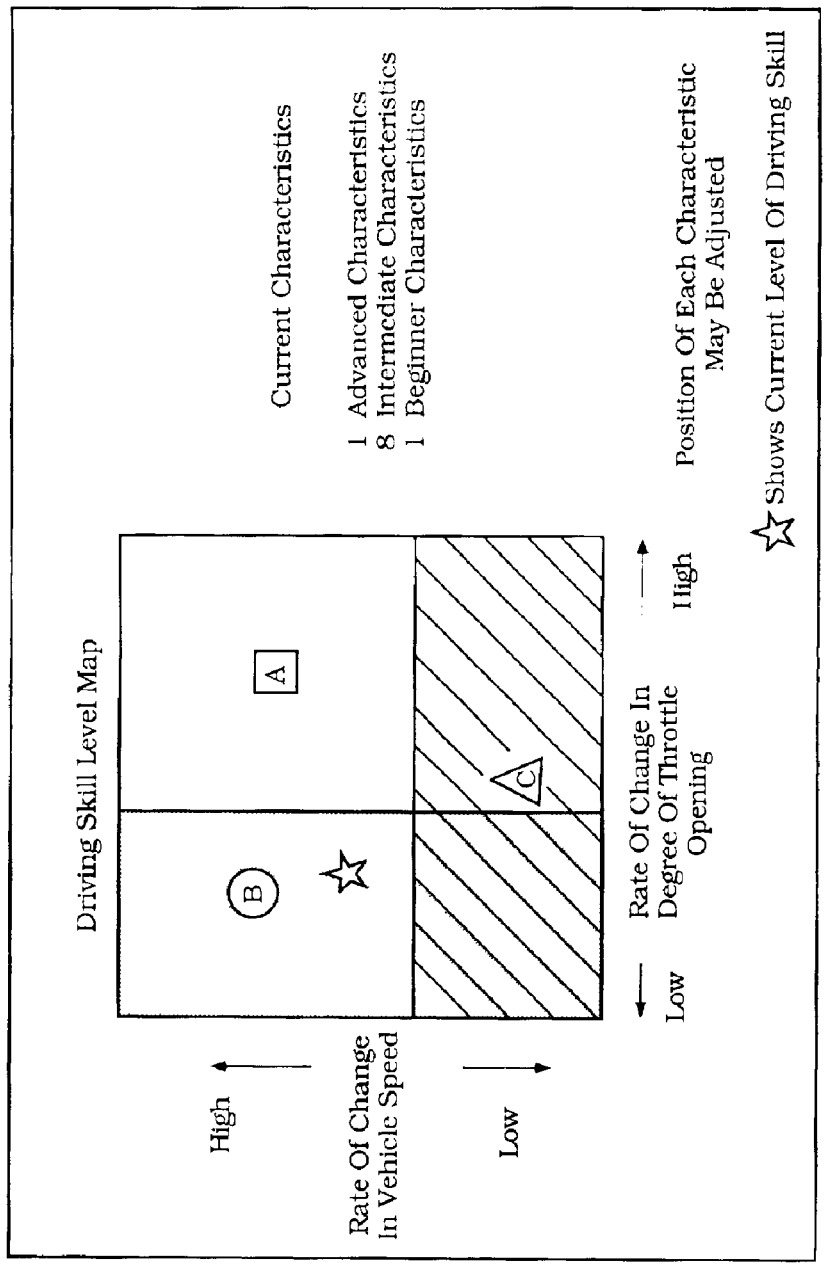
FIG. 14 is an example of the structure of the user interface in the case in which the characteristic automatic modification mechanism responds to the level of skill.

In the embodiments described above, the explanation centered on an example in which the changing characteristics related to travel conditions; however, the characteristic modification mechanism described above may modify the characteristics relating to a variety of conditions, so that for example, a change in the characteristics may be carried out in accordance with the level of driving skill of the user. In such a case, for example, a plurality of basic control parameters may be prepared in accordance with various levels of operating skill, and characteristic data may be established in accordance with the levels of operating skill for each basic control parameter, and the output ratio of the characteristics is modified in accordance with a level of operator skill obtained by analogy by the system. The estimation of the level of skill of the operator may be conducted using the rate of change in the degree of throttle opening or the rate of change in vehicle speed during a set period of time in the past. When the operator is a beginner, he is incapable of modulated driving operations, and so these rates of change will be small; however, as the level of skill increases, the operator becomes capable of increases and decreases in speed, so that it is possible to analogize to the level of skill using these rates of change. An example of the structure of a characteristic automatic modification mechanism that employs the level of skill is shown in FIG. 13. Furthermore, the user interface used in this case is shown in FIG. 14. In the figures, the designer may set the arrangement of the basic characteristic parameters within the operational skill map, and the user may adjust these. Furthermore, in this case, the amount of adjustment that the user can make may be limited to a certain extent by the designer. By doing this, it is possible to prevent an ill-advised change by an inexperienced user to characteristics suited to a high level of skill by manipulating the driving skill map.

In the embodiment described above, the explanation centered on the modification of characteristics of an electric throttle in a two-wheel vehicle; however, the present embodiment is not limited to the modification of characteristics in a two-wheeled vehicle. For example, fuel injection characteristics, engine brake characteristics, or exhaust noise characteristics or the like may be employed, and the embodiment is not limited to a control subject which is a two-wheel vehicle; the control subject may be freely selected in accordance with the conditions of use, such as the preference or level of skill of the user or the actual conditions of use, in order to switch the characteristics.

Figure 15:
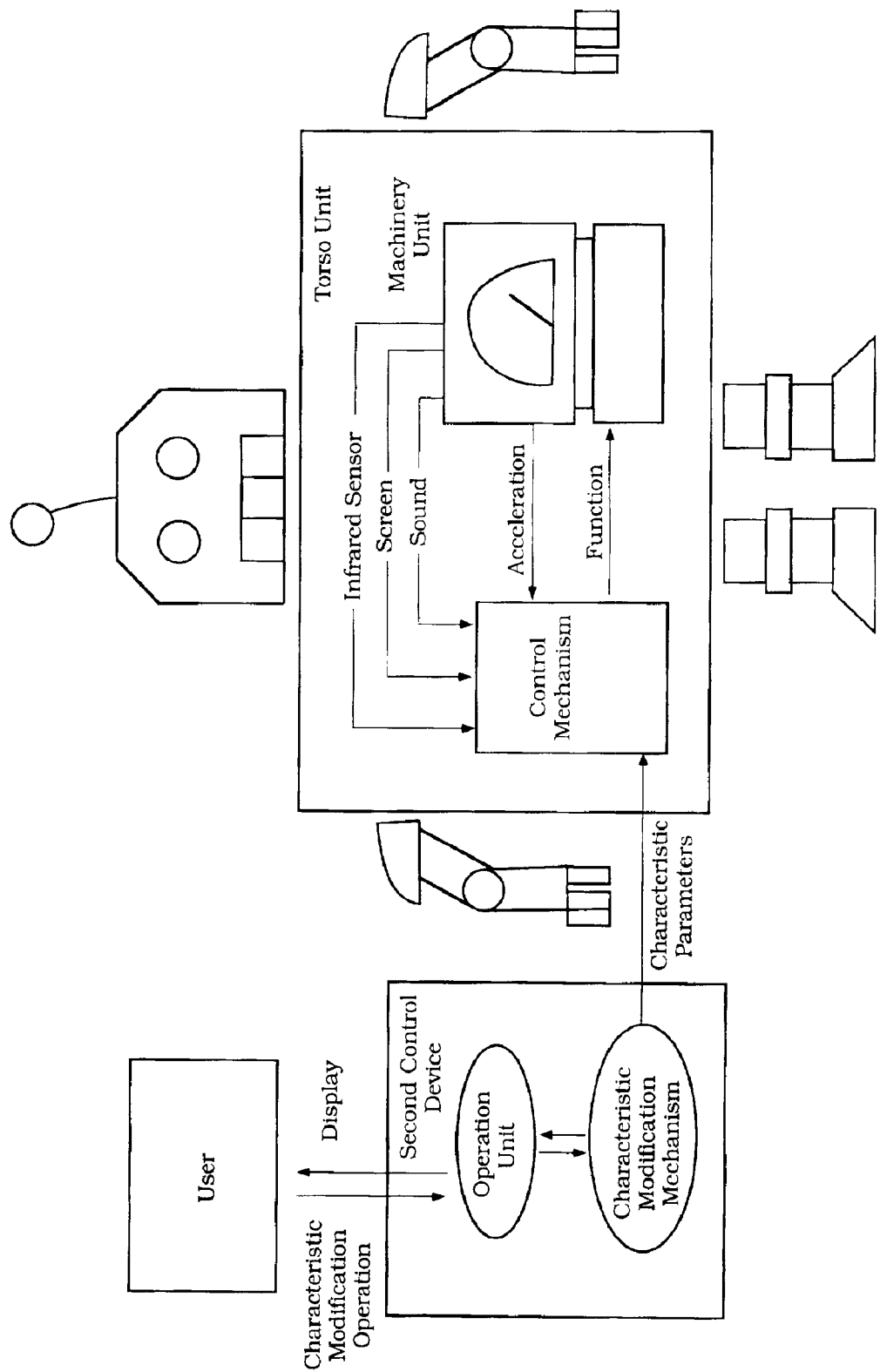
FIG. 15 shows an example in which the characteristic control device of the present invention is applied to the verbal movement characteristics of a robot.
Figure 16:
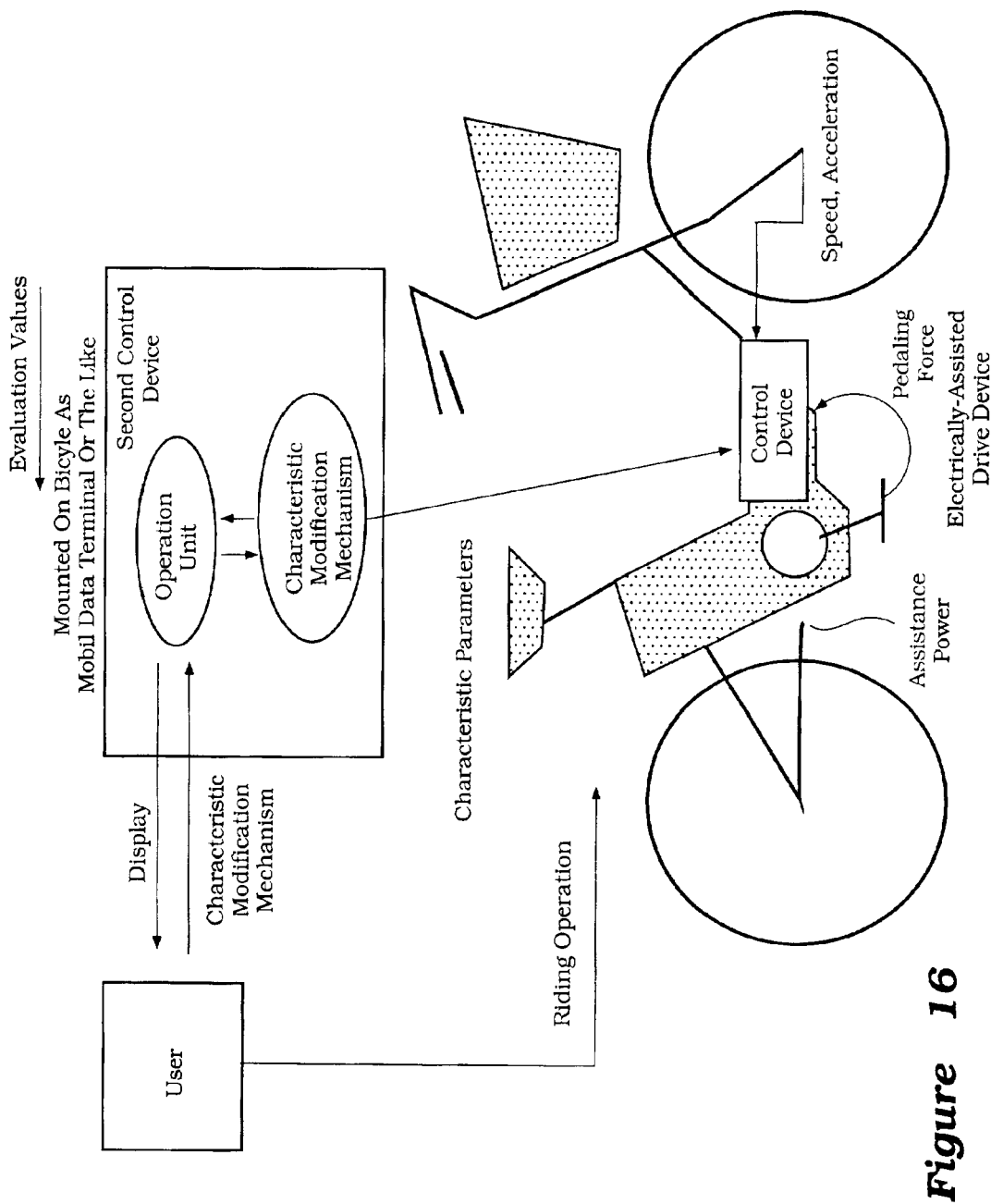
FIG. 16 shows an example in which the characteristic control device of the present invention is applied to the assistance characteristics in an electric drive-assisted bicycle.

Concretely, for example, as shown in FIG. 15, this may be applied to a robot and the interactive speech or operation of the robot may be automatically changed in accordance with the desires of the user or the environment of use or the like. Furthermore, as shown in FIG. 16, this could be applied to an electric power-assisted bicycle, and the optimal assistance ratio may be constantly outputted in accordance with changes in the condition of use, the age or physical condition of the user, the travel distance or the like. This is the same for wheelchairs with attached auxiliary electric drive apparatuses or electrically-driven cars or the like.

As described above, the characteristic control device for control subjects of the present invention is provided with a basic control module which determines the amount of control used to control the output of a control subject based on predetermined input data and control parameters which relate output to the control subject to the input data and which controls the characteristics of the control parameters, a characteristic storage mechanism for storing the basic control parameters, and a characteristic automatic modification mechanism which determines, in accordance with predetermined conditions, and automatically modifies, the control parameters which are applied to the basic control module based on the basic control parameters stored in the characteristic storage mechanism and the input data, so that this has the effect of making it possible to flexibly and finely adjust the characteristics of the control subject to the conditions of use of the control subject, such as the level of skill or desires of the user, or the environment of use or the like.

Furthermore, by making the characteristic automatic modification mechanism capable of modifying the basic control parameter ratio using fuzzy rules and capable of automatically modifying parameters applied to the basic control module, it becomes possible to smoothly conduct parameter modification, and this has the effect of eliminating the occurrence of conduct in which the control subject provides a disagreeable sensation to the user during the modification of the characteristics.

Furthermore, by providing a user interface mechanism that permits the user to directly modify the fuzzy rules in the characteristic automatic modification mechanism, it becomes possible to adapt the characteristics of the control subject to the desires of the user to a greater extent.

Furthermore, by providing a display mechanism that serves to display to the user the basic control parameters that are modified by fuzzy rules in the characteristic automatic modification mechanism, it becomes possible for the user to directly grasp the changes in characteristics.

Furthermore, another aspect of the invention provides a characteristic control device which is provided with a characteristic control module which controls the characteristics of the control parameters and is provided separately from a control device which is provided with a basic control module which determines the amount of control used to control the output of a control subject based on predetermined input data and control parameters which relate the output to the control subject to the input data, a characteristic storage mechanism which stores the basic control parameters, and a characteristic automatic modification mechanism which determines and automatically modifies the control parameters which are applied to the basic control module, based on the basic control parameters stored in the characteristic storage mechanism and the input data. Thus, the user becomes able to select whether or not to use the characteristic control device when he buys a product, and it is also possible to add the characteristic control device after the product has been bought, so that the range of selection of the user with respect to the product, which is the control subject, is increased, and furthermore, by making it possible to attach or detach the characteristic control device, the user may conduct customization with respect to the characteristics at freely selected positions, and furthermore, it becomes possible to modify the characteristics of a plurality of control subjects of the same type, or a plurality of control subjects of different types, using a single characteristic control device, and furthermore, it becomes possible to easily exchange one or the other of the control subject or the characteristic control device.

Second Embodiment

The characteristic control device for control subjects in accordance with a second embodiment of the present invention (below simply referred to as the "characteristic control device") will be explained with reference to a number of examples depicted in the attached figures. This second embodiment differs from the first embodiment described above chiefly in that it is also provided with a characteristic generation mechanism that generates basic control parameters.

Figure 17:
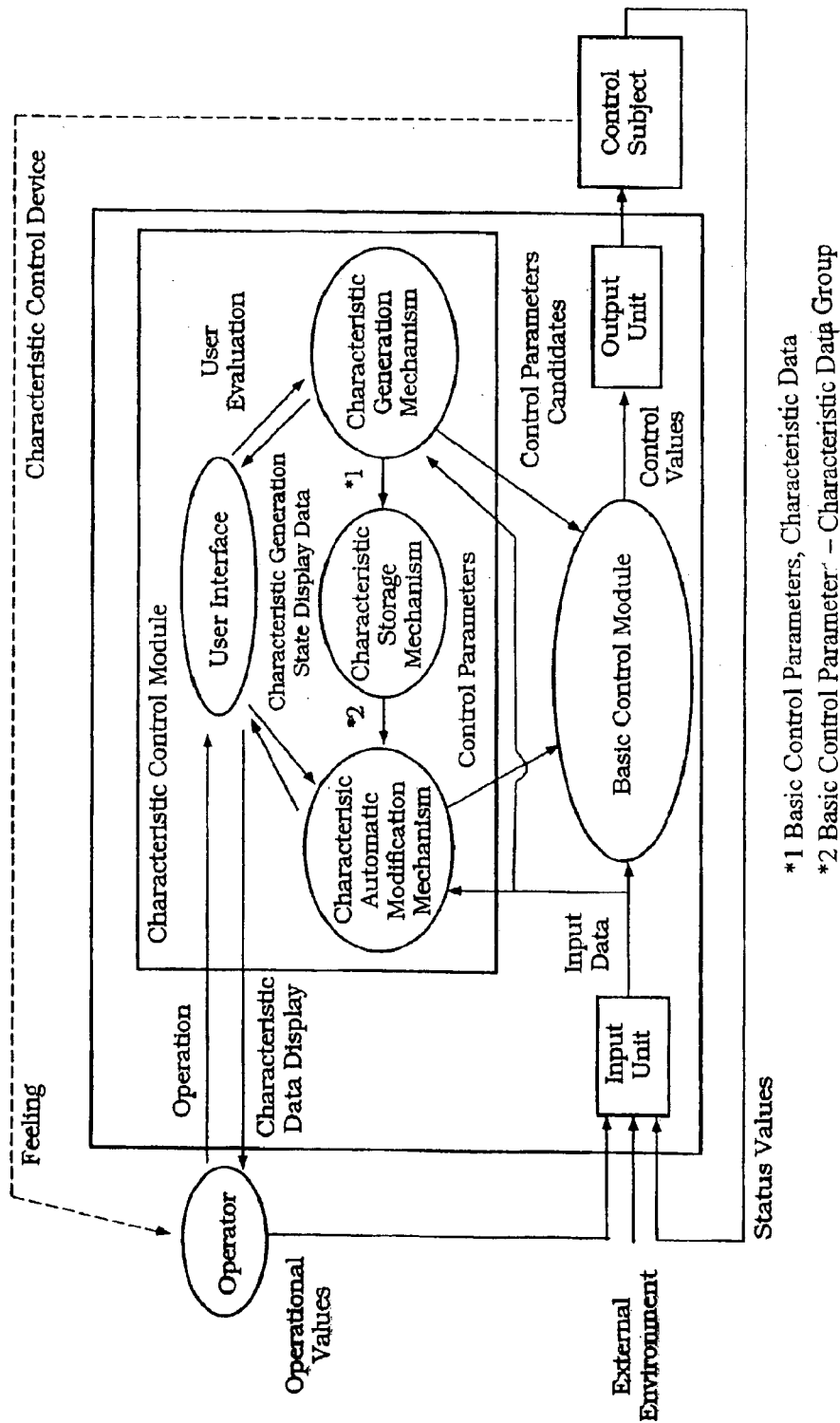
FIG. 17 is a schematic block diagram of a control device provided with a characteristic control device in accordance with a second embodiment of the present invention.

FIG. 17 is a schematic block diagram of a control device that is provided with a characteristic control device in accordance with the present invention. As shown in the figure, this control device is provided with a basic control module which calculates control amounts for the control subject based on input data inputted via an input unit (amount of operation of the user, data obtained from the external environment, the state of the control subject as obtained from the control subject, and the like), and which controls the control subject via an output unit, a characteristic generation mechanism which generates basic control parameters (basic characteristics) in accordance with predetermined evaluation standards, a characteristic storage mechanism which stores the basic control parameters generated by the characteristic generation mechanism, and a characteristic automatic modification mechanism which automatically determines the output ratio of a plurality of basic control parameters stored in the characteristic storage mechanism in accordance with predetermined input data, and which calculates control parameters to be applied to the basic control module based on the output ratio determined.

Here, the structure and function of the characteristic generation mechanism will be explained using FIGS. 18 and 19.

Figure 18:
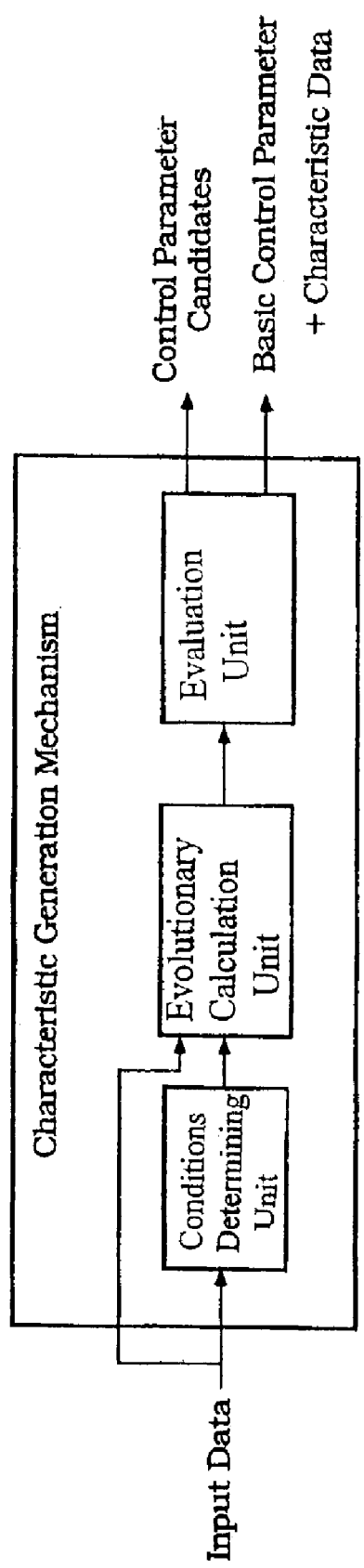
FIG. 18 is a schematic block diagram showing the structure of the characteristic generation mechanism in the control device.
Figure 19:
FIG. 19 is a flow chart showing in schematic form the flow of the processing from characteristic generation to characteristic storage in the control device of FIG. 17.

FIG. 18 is a schematic block diagram showing the structure of the characteristic generation mechanism, while FIG. 19 is a flow chart showing the flow of processing from the generation of characteristics by the characteristic generation mechanism to the characteristic storage process of the characteristic storage mechanism.

As shown in FIG. 18, the characteristic generation mechanism is provided with a condition determining unit, an evolutionary calculation unit, and an evaluation unit.

The evolutionary calculation unit generates, for example, a plurality of basic control parameter candidates (hereinbelow referred to as "control parameter candidates") using an evolutionary calculation method, and evaluation of these control parameter candidates is conducted in the evaluation unit based on predetermined input data. Then, in the condition determining unit, a determination is made with respect to the conditions of use of the control subject (for example, when the control subject is a two-wheeled vehicle, the travel characteristic) at least for the time at which the control parameter candidates were generated by the evolutionary calculation unit, and these are applied to each control parameter candidate as characteristic data.

In this way, in the characteristic generation mechanism, the generation and evaluation of the control parameter candidates is repeated, and when control parameter candidates are obtained which satisfy the predetermined evaluation standard, these are used as the basic control parameters, and are outputted to the characteristic storage mechanism together with characteristic data, and in the characteristic storage mechanism, these basic control parameters and characteristic data are mapped in accordance with the status values during the generation of the basic control parameters.

In this embodiment, it is possible to construct the "characteristic data" by adding appropriate arbitrary data to the conditions of use of the control subject during the generation of the control parameter candidates, as described above. Concretely, for example, when the travel characteristics of the two-wheeled vehicle which is the control subject are in an accelerating state during the generation of the control parameter candidates, then the characteristic data are "accelerating characteristics"0 or "accelerating characteristics plus the level thereof" (for example, acceleration state: low, medium, high). Additionally, the identification of the user (for example, Mr. A or Mr. B or the like), the physical condition of the user (for example, the body temperature or pulse rate or the like), the level of skill of the user (for example, the amount of time from the obtaining of a driver's license to the present), or the environment of use of the control subject (for example, the weather, the place, or the time or the like) may be added thereto. By means of this, detailed data are obtained, such as, for example, "Mr. A, body temperature of x°, pulse rate of x°, fair weather, acceleration state: low."

The characteristic storage mechanism is capable of storing the basic control parameters by increasing the number of maps in accordance with the data comprising the characteristic data. Concretely, a plurality of maps relating to the travel characteristics may be employed in accordance with the classification of the users, or a plurality of maps relating to the travel characteristics may be employed in accordance with the weather, and the basic control parameters may be stored.

Furthermore, examples of the evaluation method for the control parameter candidates explained above include a method in which evaluation values are obtained by the direct input of evaluation relating to the characteristics of the users via an appropriate user interface (see the dashed line in FIG. 17), and a method in which evaluation values are automatically calculated from the operation state and operation history of the user using coefficients which are stored in advance in the characteristic generation mechanism. The first method has the advantage that the desires of the user are reflected to a great extent in the characteristic generation, and that it is possible to provide to the user the pleasure of having a role in the generation of the characteristics of the control subject. Furthermore, the second method has the effect of reducing the burden on the user with respect to the generation of characteristics. These methods may be selected in accordance with the type of control subject or the age or the like of the user of the control subject.

The evaluation unit shown in FIG. 18 employs the second evaluation method. The operational values of the user after actual control of the control subject using the control parameter candidates are inputted as input data, and based on the changes in the operational values of the user, the control parameter candidates are evaluated. Concretely, for example, when no changes are observed in the operational values of the user even after actual control of the control subject using the control parameter candidates, it is possible to determine that the user is satisfied with the characteristics obtained as a result of the control parameter candidates, while when changes are observed in the operational values of the user, it may be determined that the user is not satisfied with the characteristics obtained as a result of the "control parameter candidates," and is attempting to modify the characteristics by means of his operation. Accordingly, for example, the evaluation values of each control parameter candidate may be determined by relating the evaluation values to the amount of change in the operation values of the user.

The flow of processing from the process of characteristic generation by the characteristic generation mechanism to the characteristic storage process by the characteristic storage mechanism will be explained with reference to the flow chart of FIG. 19.

As shown in FIG. 19, the characteristic generation mechanism initiates the setting of characteristics based on an appropriate preset trigger (for example, an indication from the user, a change in the use conditions, regular intervals, or the like). When the characteristic setting is initiated, the evolutionary calculation unit in the characteristic generation mechanism generates a plurality of control parameter candidates, and applies characteristic data determined in the condition determining unit to each control parameter candidate. Then, any of the plurality of control parameter candidates is outputted to the basic control module, and the characteristics of the control subject, that is to say, the control parameters of the basic control module, are modified to the control parameter candidate (step 1).

Next, the control subject is controlled by the basic control module using this control parameter candidate, and an evaluation of the characteristics is conducted (step 2).

Concretely, the basic control module calculates the amount of control based on the control parameter candidate from the characteristic generation mechanism, and outputs this to the control subject via the output unit. The control subject that has received the control output operates in accordance with the control values, and the status values at this time are detected, and the operator receives some sort of feeling from the operational state at this time. Then, based on this feeling, the operator applies new operational values to the control device and the status values of the control subject are inputted, and this data is inputted into the characteristic generation mechanism. As a result, in the characteristic generation mechanism, an evaluation is conducted based on the input data, and the processing of steps 1 and 2 above is repeated until the preestablished evaluation standards are satisfied (step 3), and when control parameter candidates are obtained which satisfy the evaluation standards, the characteristic setting process is terminated (step 4). Then, the characteristic generation mechanism employs these control parameter candidates as the basic control parameters, and outputs the basic control parameters to the characteristic storage mechanism together with characteristic data, and the characteristic storage mechanism maps the characteristic data together with the basic control parameters (step 5).

The structure of the characteristic automatic modification mechanism is the same as in the first embodiment described above, and so a detailed explanation thereof will be omitted here.

In this embodiment, in the characteristic generation unit, basic control modules are generated in sequence, so that the amount of characteristic data increases in proportion thereto. Accordingly, in the characteristic output ratio determining unit, the characteristic recognition unit recognizes new characteristic data as the basic control modules are newly generated in the characteristic generation unit, and conducts the creation or deletion of rules or the modification of the conclusion of rules in conformity with this new characteristic data. It is possible to automate this creation, deletion, or modification of the fuzzy rules and by means of this, it is also possible to lessen the burden placed on the user related to the automatic changing of characteristics.

The structure and function of the characteristic output ratio determining unit and the characteristic calculation unit are the same as in the first embodiment described above, so that a detailed description thereof will be omitted here.

As described in the first embodiment, in the characteristic automatic modification mechanism, a relationship is established between the input data (for example, the current characteristics) and the characteristic data. For this reason, the type of input data applied to the characteristic automatic modification mechanism is determined in accordance with the type of data comprising the characteristic data of each basic control parameter determined by the characteristic generation mechanism.

Accordingly, by combining the types of data comprising the characteristic data, it is possible to automatically modify the output ratio of the basic control parameters. This combination may be arbitrarily determined; examples thereof are the methods described hereinbelow.

(A) A method in which the output ratio of the basic control parameters generated in response to the preferences of a user is changed in accordance with the conditions of use.

(B) A method in which the output ratio of the basic control parameters generated in response to the preferences of a user is changed in accordance with bodily condition.

(C) A method in which the output ratio of the basic control parameters generated in response to the preferences of a different user is changed in accordance with a user.

(D) A method in which the output ratio of the basic control parameters generated in accordance with the skill level of a different user is changed in accordance with a user.

(E) A method in which the output ratio of the basic control parameters generated in accordance with the conditions of use is changed in accordance with the conditions of use.

(F) A method in which the output ratio of the basic control parameters generated in accordance with the bodily condition of a user is changed in accordance with that bodily condition.

When method (A) above is applied, in the characteristic generation unit, basic control parameters are generated as standards for evaluating the preferences of a user, and data expressing the state of use of the control subject are established as characteristic data, while the characteristic automatic modification mechanism accepts, as input data, data which may be related to data expressing the conditions of use of the control subject, and relates the two to one another. Concretely, where the control subject is a two-wheeled vehicle, and the data expressing the condition of use thereof are travel characteristics (for example, travel characteristics: high speed travel), the characteristic automatic modification mechanism is capable of using, as the data which may be related to the travel characteristics, the vehicle speed and rate of change in degree of throttle opening as input data, and conducts the relating of these to one another by means of fuzzy rules, functions, or maps or the like.

Furthermore, when method (B) is employed, in the characteristic generation unit, basic control parameters are generated as standards for evaluating the preferences of a user, and data expressing the bodily condition of a user (for example "acceleration characteristics: low/body temperature x°/pulse rate x") added to the conditions of use of the control subject are established as the characteristic data, and the characteristic automatic modification mechanism employs data which may be related to the data expressing the conditions of use of the control subject and data expressing the subject of the user as input data, and relates these to one another. The data expressing the bodily condition of the user are not limited to the bodily temperature and pulse rate described above, but may employ the amount of perspiration or other data as well. Furthermore, the data expressing this bodily condition may be detected by means of various sensors, and the detected values may be employed as the input data in the characteristic generation unit and the characteristic automatic modification mechanism.

Furthermore, when method (C) above is employed, in the characteristic generating unit, basic control parameters are generated as standards for evaluating the preferences of the user, and in addition to data expressing the conditions of use of the control subject, data expressing the user's identification (for example, "travel characteristics: low acceleration/Taro Yamaha") are established as the characteristic data, and the characteristic automatic modification mechanism uses, as input data, data which may be related to data expressing the conditions of use of the control subject and data expressing the user's identification and these are related to one another. Concretely, the user identification may be recognized from the pattern of operation of the user, or alternatively, characteristic values of the user (such as, for example, the fingerprint, the iris, or the like) may be sensed, and the detected values may be used to determine the user, or alternatively, determination may be conducted by the direct input of an identification code by the user.

Additionally, when method (D) above is employed, in the characteristic generation unit, basic control parameters are generated as standards for evaluating the level of skill of the user, and in addition to data expressing the conditions of use of the control subject, data expressing the identification of the user (for example, "travel characteristics: low acceleration/Taro Yamaha") are established as the characteristic data, and the characteristic automatic modification mechanism employs, as input data, data which may be related to data expressing the conditions of use of the control subject and data expressing the identification of the user and relates these to one another.

Furthermore, when method (E) above is employed, in the characteristic generation unit, basic control parameters are generated as standards for evaluating the conditions of use of the control subject, and data expressing the conditions of use of the control subject are established as the characteristic data, and the characteristic automatic modification mechanism employs, as input data, data which may be related to data expressing the conditions of use of the control subject and relates these.

Furthermore, when the method (F) described above is employed, the characteristic generation unit generates basic control parameters as standards for evaluating the bodily condition of the user, and in addition to the conditions of use of the control subject, data expressing the bodily condition of the user (for example, "acceleration characteristics/body temperature x°/pulse rate x") are established as the characteristic data, and the characteristic automatic modification mechanism employs, as input data, data which may be related to the data expressing the conditions of use of the control subject and data expressing the bodily condition of the user, and relates these to one another.

In the control device described above, a mechanism may be provided for indicating the output ratio of the basic control parameters that are currently employed. By means of this, the user is able to directly perceive changes in the characteristics.

Furthermore, in the explanation above, the characteristic control device was explained using an example in which it was incorporated into a control device provided with a basic control module; however, as in the first embodiment, the characteristic control device may be constructed separately from a control device which is provided with a basic control module.

Figure 20:
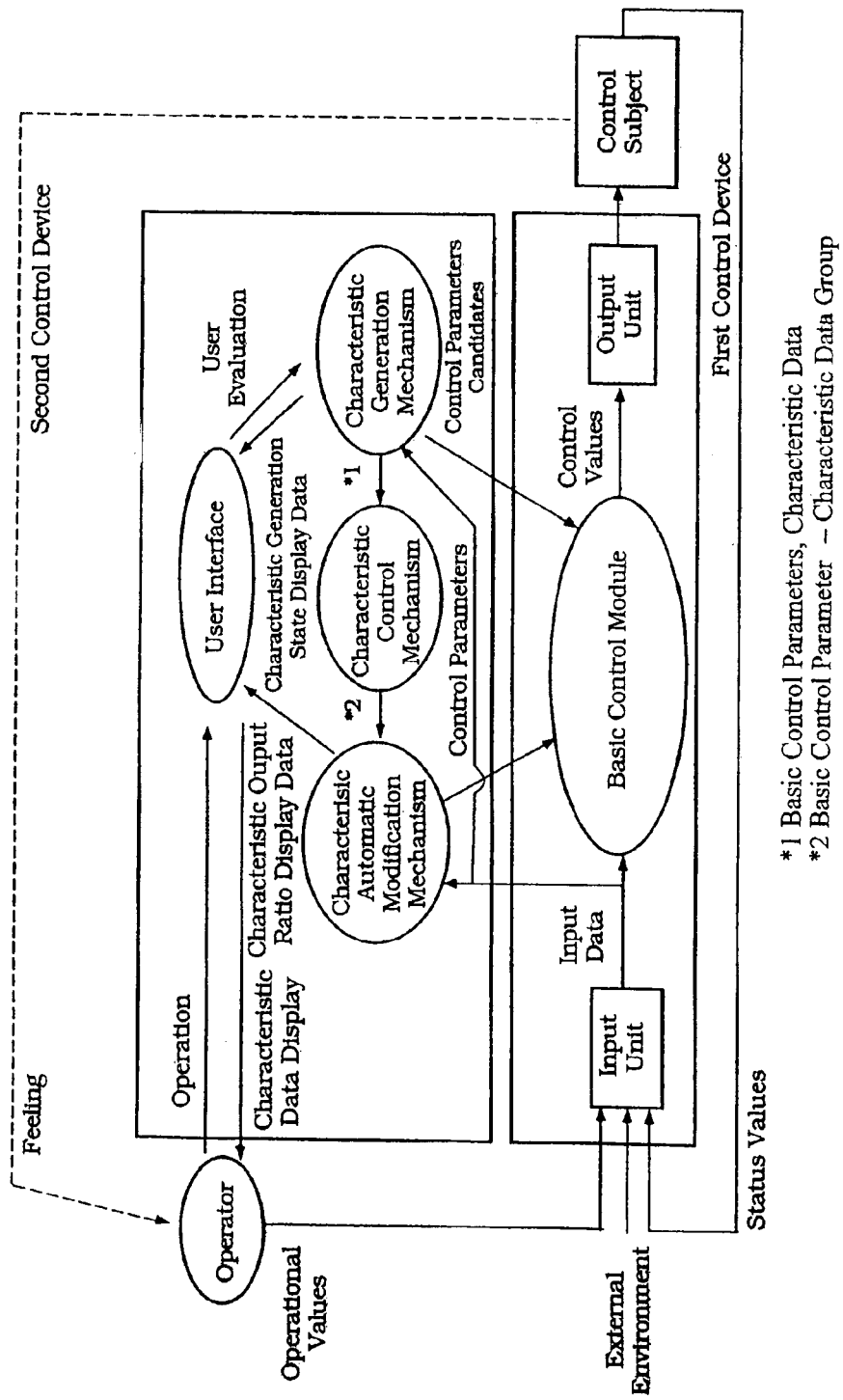
FIG. 20 is a block diagram showing an example of a structure in which the characteristic control device and the control device provided with the basic control module are provided separately.

FIG. 20 is a schematic block diagram in which a control device provided with a basic control module is made a first control device which is incorporated into a control subject, while the characteristic control device is made a second control device, and these are separately provided.

As shown in the figure, the first control device is provided with a basic control module which calculates the control values of the control subject based on the input data inputted via the input unit (the operation values of the user, data obtained from the external environment, status values of the control subject obtained from the control subject, and the like) and controls the control subject via the output unit.

Furthermore, the second control device is provided with a characteristic generation mechanism which generates basic control parameters (basic characteristics) of the basic control module in accordance with predetermined evaluation standards, a characteristic storage mechanism which stores the basic control parameters generated by the characteristic generation mechanism, and a characteristic automatic modification mechanism, which automatically determines the output ratio of a plurality of basic control parameters stored in the characteristic storage mechanism in accordance with predetermined input data, and calculates control parameters to be applied to the basic control module based on the output ratio that is determined.

The processing mechanisms provided in the first control device and the second control device are the same as those in the example shown in FIG. 1 and described above, so that a detailed explanation is omitted here.

In the same way as in the first embodiment, in the second control device, a user interface may be provided where necessary. This user interface may include, where necessary, a display mechanism for displaying the characteristic generation conditions in the characteristic generation mechanism, an input mechanism allowing a user to directly input an evaluation in the characteristic generation mechanism, and/or a display mechanism for displaying the characteristic output ratio in the characteristic automatic modification mechanism.

The results and advantages of providing the characteristic control device as a separate structure are as described in the first embodiment above.

The characteristic control device of the present invention was described above using a general example in which a control subject was not specified; however, hereinbelow in a more concrete example in which the control subject is specified, an example will be explained in which the characteristic control device is applied to a travel characteristic control device for two-wheeled vehicles.

An electric throttle has a throttle valve for controlling the engine air intake which is driven by a motor in response to accelerator operational values which are inputted by an operator, and by controlling the characteristics of this electric throttle, it is possible to affect the drive feeling characteristics of the vehicle.

The characteristics of an electric throttle that may be modified include static characteristics and dynamic characteristics.

Static characteristics include the degree of opening of the throttle valve when the throttle input is constant, which affects the constant travel characteristics of the vehicle. A number of distinctive characteristics are shown in FIG. 6. The static characteristics may employ any type of function insofar as the throttle valve output is zero when the throttle input is zero. By changing the static characteristics of the throttle opening in this way, it is possible to output different degrees of throttle valve opening in response to the same throttle input.

The dynamic characteristics are related to the degree of change in the degree of opening of the throttle valve in response to changes in the throttle input, and affect the transient characteristics of the vehicle. Concretely, a temporary delay filter and incomplete differential filter are combined, and the parameters of these are modified. The relationship between the throttle input and the throttle valve output when the dynamic characteristics are modified is shown in FIG. 7.

Figure 21:
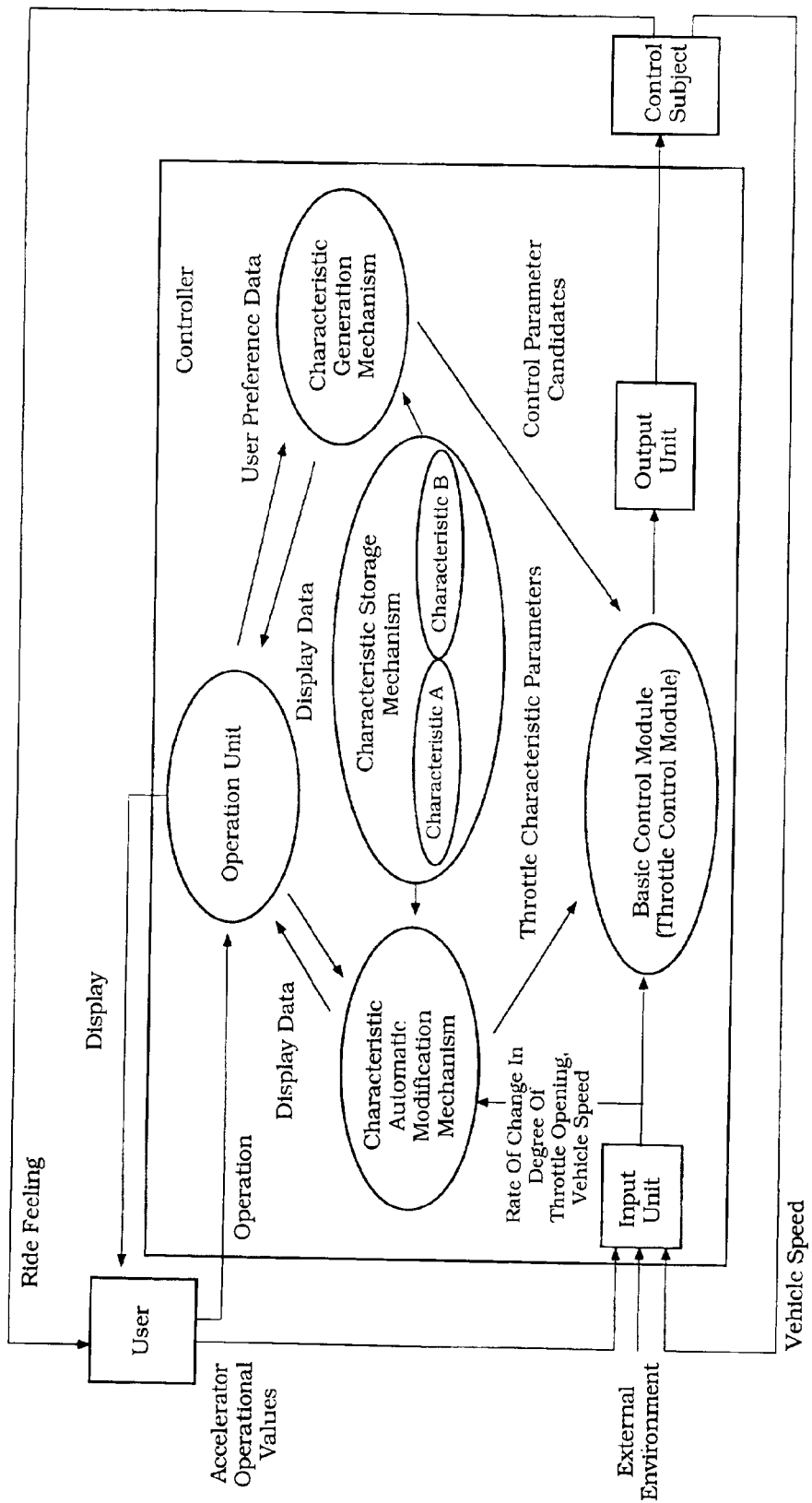
FIG. 21 is a schematic block diagram of a travel characteristic control device for two-wheeled vehicles to which the characteristic control device is applied.

FIG. 21 is a schematic block diagram of a travel characteristic control device for two-wheeled vehicles to which the characteristic control device is applied. As shown in the figure, this travel characteristic control device is provided with a throttle control module which determines the control output of the throttle valve using throttle control parameters, a characteristic generation mechanism which controls the throttle characteristic parameters, a characteristic storage mechanism, and a characteristic automatic modification mechanism.

The throttle control module determines the degree of opening of the throttle valve from the throttle input based on the throttle characteristic parameters. In this module, the static characteristics and the dynamic characteristics of the throttle are simultaneously altered. A block diagram of the throttle control module is shown in FIG. 9. As shown in the figure, this static control module is provided with a static characteristic modification unit and a dynamic characteristic modification unit; the static characteristic modification unit converts the throttle input into a virtual throttle input, while the dynamic characteristic modification unit determines the degree of opening of the throttle valve from the virtual throttle input. In this embodiment, low opening static characteristics, high opening static characteristics, temporary delay time constants, and differential gain are employed as the characteristic parameters.

As depicted in FIG. 18, the characteristic generation mechanism is provided with an evaluation unit, a characteristic determining unit, and an evolutionary calculation unit, and automatically generates the basic throttle characteristic parameters which determine the travel characteristics. An example thereof is the genetic coding method shown in FIG. 10, which employs a genetic algorithm in the evolutionary calculating unit. In the figure, references a and b indicate parameters which relate to a static characteristic function f(x), c indicates a differential time Td which is related to the dynamic characteristics, and reference d indicates a temporary delay time constant T which is related to the dynamic characteristics. When this genetic algorithm is employed in the evolutionary calculation unit, a generation is formed by a plurality of genes (that is to say, control parameter candidates) which are coded in this manner, and the characteristic data which are determined by the condition determining unit are applied to each gene, and each gene is given a test run by being actually applied to the throttle characteristic parameters, and from the results thereof, an evaluation is conducted of each gene, and new generations are repeatedly produced by selection, cross-over, or mutation until the evaluation values meet predetermined standards.

In the present embodiment, the characteristic data are data which relate to "travel characteristics," and data relating to the travel characteristics are attached to each of the characteristic data, such as, for example, "travel characteristics: high speed travel characteristics," "travel characteristics: low speed travel characteristics," "travel characteristics: winding travel characteristics," and "travel characteristics: accelerating travel," and the like.

Figure 22:
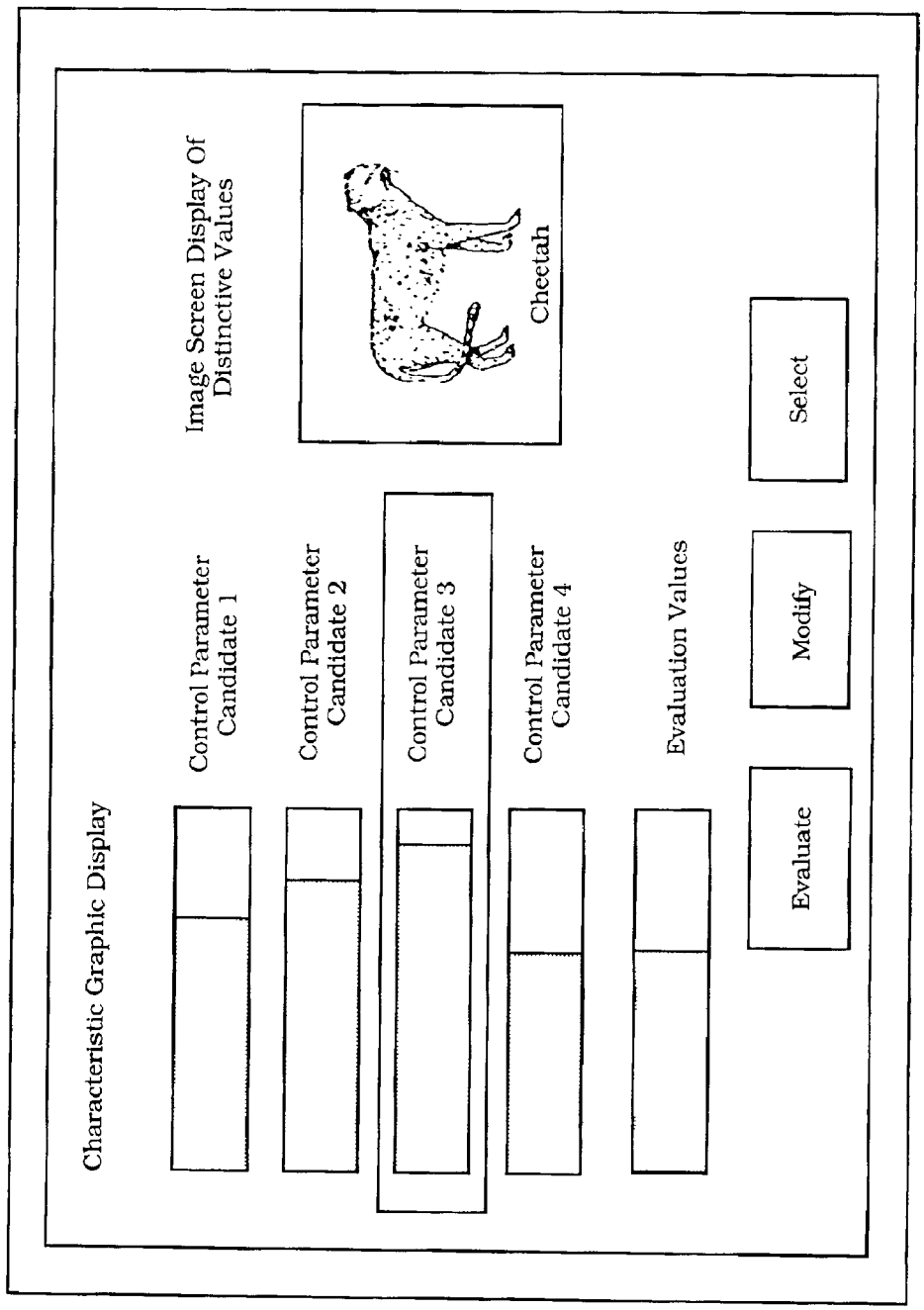
FIG. 22 shows an example of the operation panel of an operation unit.

The evaluation of each gene is conducted in the evaluation unit. Examples of the calculation method for the evaluation values are a method in which an evaluation of the characteristics by the user is directly input via a user interface, or a method in which the values are automatically calculated from the operational history of the user using functions prepared in advance or the like. When evaluation values are directly inputted, as shown in FIG. 21, an operation unit which may be operated by a user is added, and the information inputted via this operation unit is inputted into the evaluation unit. In this case, the user either obtains the data displayed on the operation unit or data obtained from his bodily feeling which relate to the characteristics, and may directly input the evaluation values via the operation unit. An example of an operation panel of the operation unit is shown in FIG. 22. In this operation panel, a graphic display of the parameters which expresses the degree of suitability (that is to say, the characteristic values of each gene (control parameter candidates)) with respect to the characteristic data is combined with a display expressing the characteristic values of each gene as an image. Concretely, for example, if this generation of characteristic data is "travel characteristics: acceleration characteristics," then as the value in the graphic display increases, the gene thereof has higher acceleration characteristics, while when the value in the graphic display becomes smaller, the acceleration characteristics of the gene become lower. Furthermore, the image display shows an image screen that relates to the characteristic values of the gene that is selected. Concretely, if the characteristic data are "travel characteristics: acceleration characteristics," then when a gene having high acceleration characteristics is selected, the image of a quick animal such as a cheetah or the like is displayed, while when a gene having low acceleration characteristics is selected, the image of a slow-moving animal such as an elephant or the like is displayed. In this way, the user can directly grasp the characteristics of the gene by changing the image display, and this aids in the evaluation process.

In the figure the "modification button" is used to change the gene which is to be evaluated, the "selection button" is used to select the gene which is to be evaluated, and the "evaluation button" is used to enter an evaluation into the selected gene. The input of the evaluation is conducted by relating the number of times the evaluation button is pushed, the time, and the evaluation, for example.

Furthermore, when the evaluation values are automatically calculated, for example, the smoothness of the throttle operation may be calculated from the rate of change in the throttle rate of change, and this value may be used as an evaluation value.

When evaluation values are found which meet predetermined standards, that gene (that is to say, control parameter candidate) is used as the basic characteristic parameters, and this is mapped together with the characteristic data in the characteristic storage mechanism.

Next, the characteristic automatic modification mechanism will be explained. FIG. 11 is a block diagram showing the characteristic automatic modification mechanism. As shown in FIG. 11, the characteristic automatic modification mechanism is provided with a characteristic recognition unit, a characteristic output ratio determining unit, and a characteristic calculation unit.

The characteristic output ratio determining unit relates the input data with the characteristic data of each basic control module, and has fuzzy rules which are structured so as to permit an output ratio of each basic control module to be determined from the input data.

Concretely, for example, if the following are stored in the characteristic storage mechanism:

basic control parameter A: characteristic data (travel characteristics: winding travel characteristics), basic control parameter B: characteristic data (travel characteristics: low speed travel characteristics), basic control parameter C: characteristic data (travel characteristics: high speed travel characteristics), then the input data into the characteristic output ratio determining unit are the rate of change in the throttle and the vehicle speed, and the fuzzy rules in the characteristic output ratio determining unit may be established as given below.

Rule 1: "If the throttle rate of change is high, the proportion of winding travel is high."

Rule 2: "If the rate of speed is low, the proportion of low speed travel is high."

Rule 3: "If the rate of change in the throttle is low, and the speed is high, then the proportion of high speed travel is high."

This rule is displayed to the user as a map such as that shown in FIG. 12. In the figure, the "lion" character corresponds to the characteristic data of basic control parameter A, the "squirrel" character corresponds to the characteristic data of basic control parameter B, and the "rhinoceros" character corresponds to the characteristic data of basic control parameter C. Furthermore, the values of the boundary lines determining the regions of each character serve as the boundaries between viewing the values of the input data as "large" or "small" in the antecedent part of the fuzzy rules. Additionally, the star indicates the position of the current characteristics obtained from the input data. In this way, the relationship between the fuzzy rules and the current characteristics is mapped and displayed to the user, and thereby it is possible for the user to visually and directly confirm the modification of the characteristics and the current position of the characteristics.

Furthermore, in the characteristic generation unit, the basic control parameters are generated in sequence, so that the amount of characteristic data increases accordingly. Accordingly, in the characteristic output ratio determining unit, as basic control parameters are newly generated in the characteristic generating unit, the characteristic recognition unit recognizes new characteristic data, and creates or deletes rules or modifies the conclusion of the rules to suit this new characteristic data.

In the characteristic output ratio determining unit, the degree of suitability of the current characteristics with respect to the characteristic data is determined using the fuzzy rules described above, and this is outputted to the characteristic calculation unit.

The characteristic calculation unit calculates the values of each basic control parameter A, B, and C from the map in the characteristic storage mechanism based on data relating to the status values contained within the input data, and using the degree of suitability with respect to each characteristic datum inputted from the characteristic output ratio determining unit, a weighted average of the degree of suitability of each basic control parameter value is calculated, and this value is outputted as the throttle characteristic parameter which is to be applied to the basic control module.

Concretely, as shown in FIG. 11, if, for example, the values of the basic control parameter A (winding travel characteristic) stored in the characteristic storage mechanism are (40, 40, 0, 0), the values of the basic control parameter B (low speed travel characteristic) are (20, 20, 0, 0), the values of the basic control parameter C (high speed travel characteristic) are (20, 20, 20, 0), and the degree of compatibility of each characteristic data with respect to each rule obtained from the characteristic output ratio determining unit is winding characteristic: 4, low speed characteristic: 0, and high speed travel characteristic: 1, then the values of the throttle characteristic parameter outputted from the characteristic calculating unit are (36, 36, 4, 0).

In the embodiment described above, the explanation centered on the modification of characteristics of an electric throttle in a two-wheel vehicle; however, the present embodiment is not limited to the modification of characteristics in a two-wheeled vehicle. For example, fuel injection characteristics, engine brake characteristics, or exhaust noise characteristics or the like may be employed, and the embodiment is not limited to a control subject which is a two-wheel vehicle; the control subject may be freely selected in accordance with the conditions of use, such as the preference or level of skill of the user or the actual conditions of use, in order to switch the characteristics.

Figure 23:
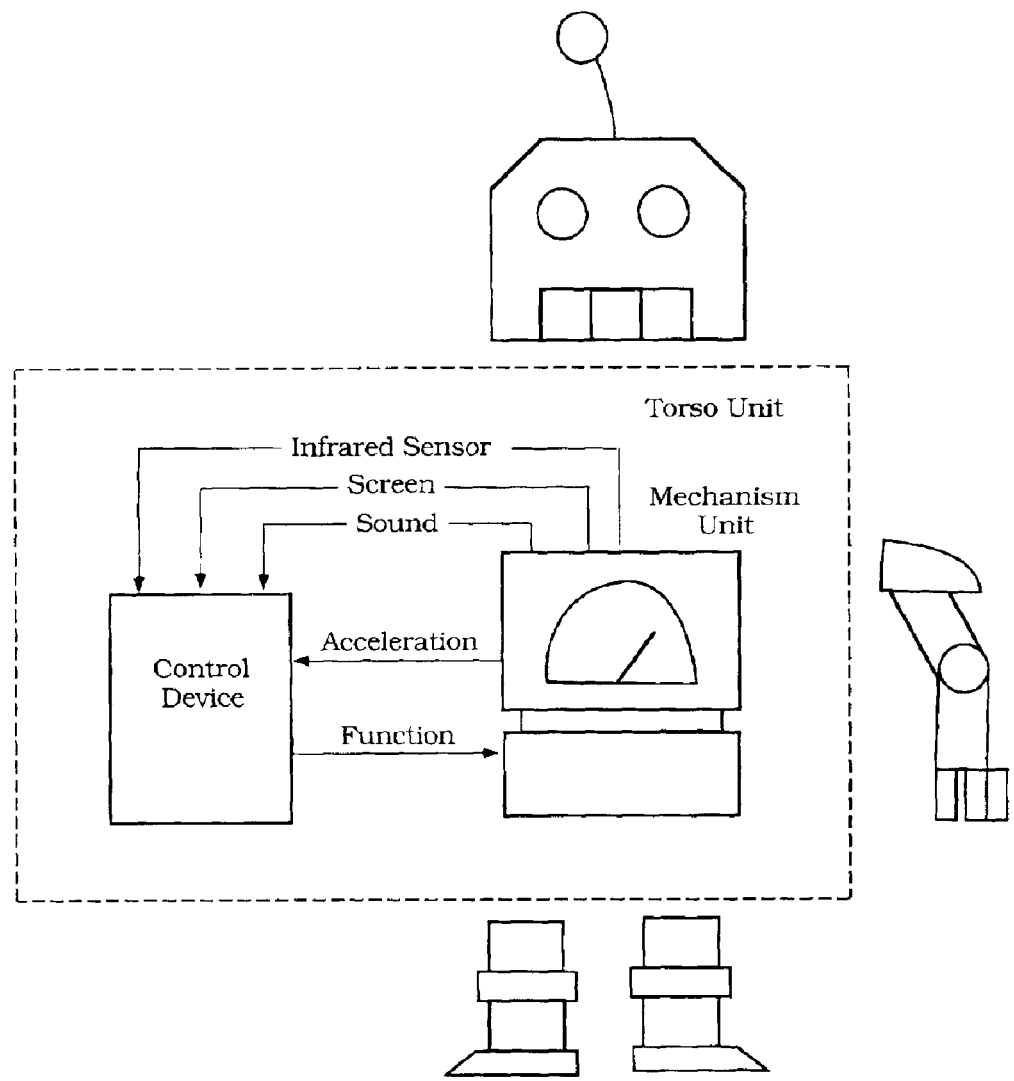
FIG. 23 shows an example in which the characteristic control device of the present invention is applied to the verbal movement characteristics of a robot.
Figure 24:
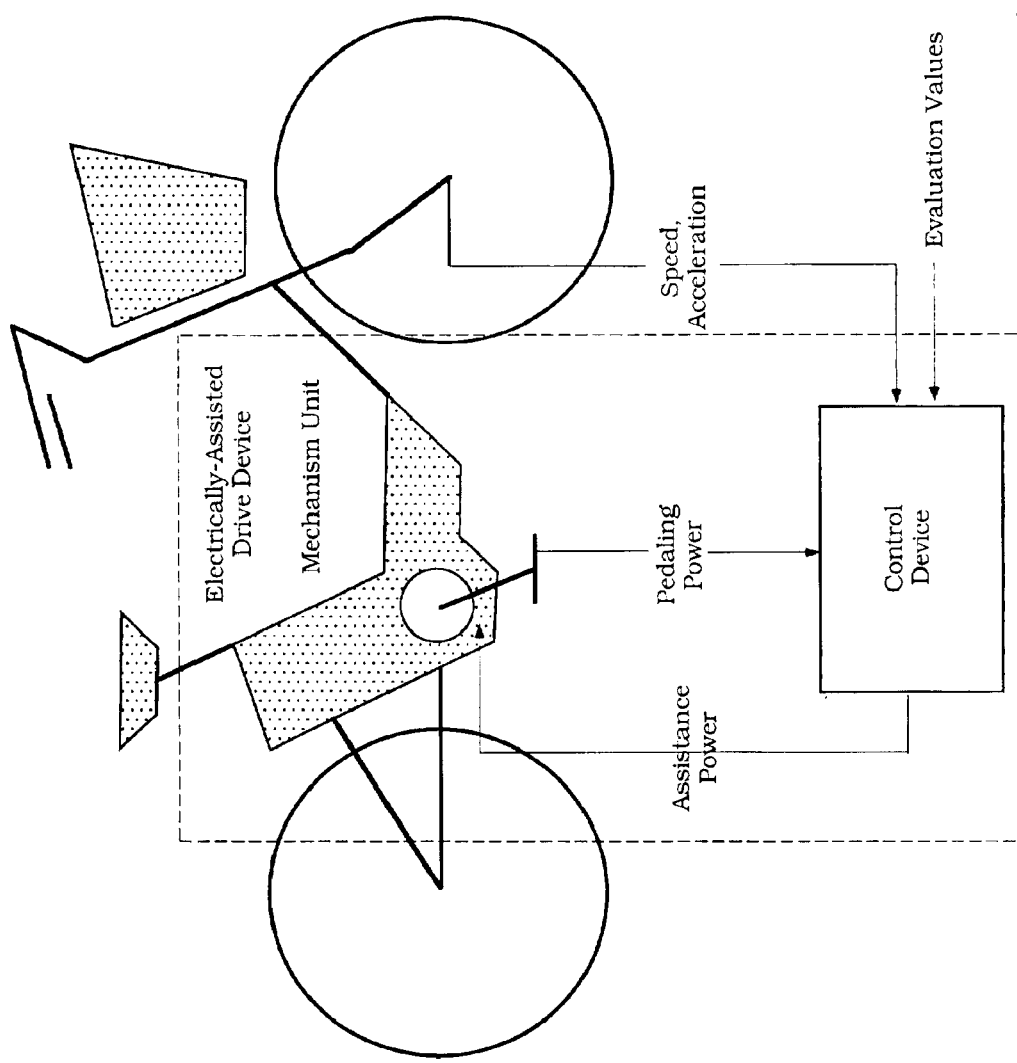
FIG. 24 shows an example in which the characteristic control device of the present invention is applied to the assistance characteristics in an electric drive-assisted bicycle.
Figure 22:
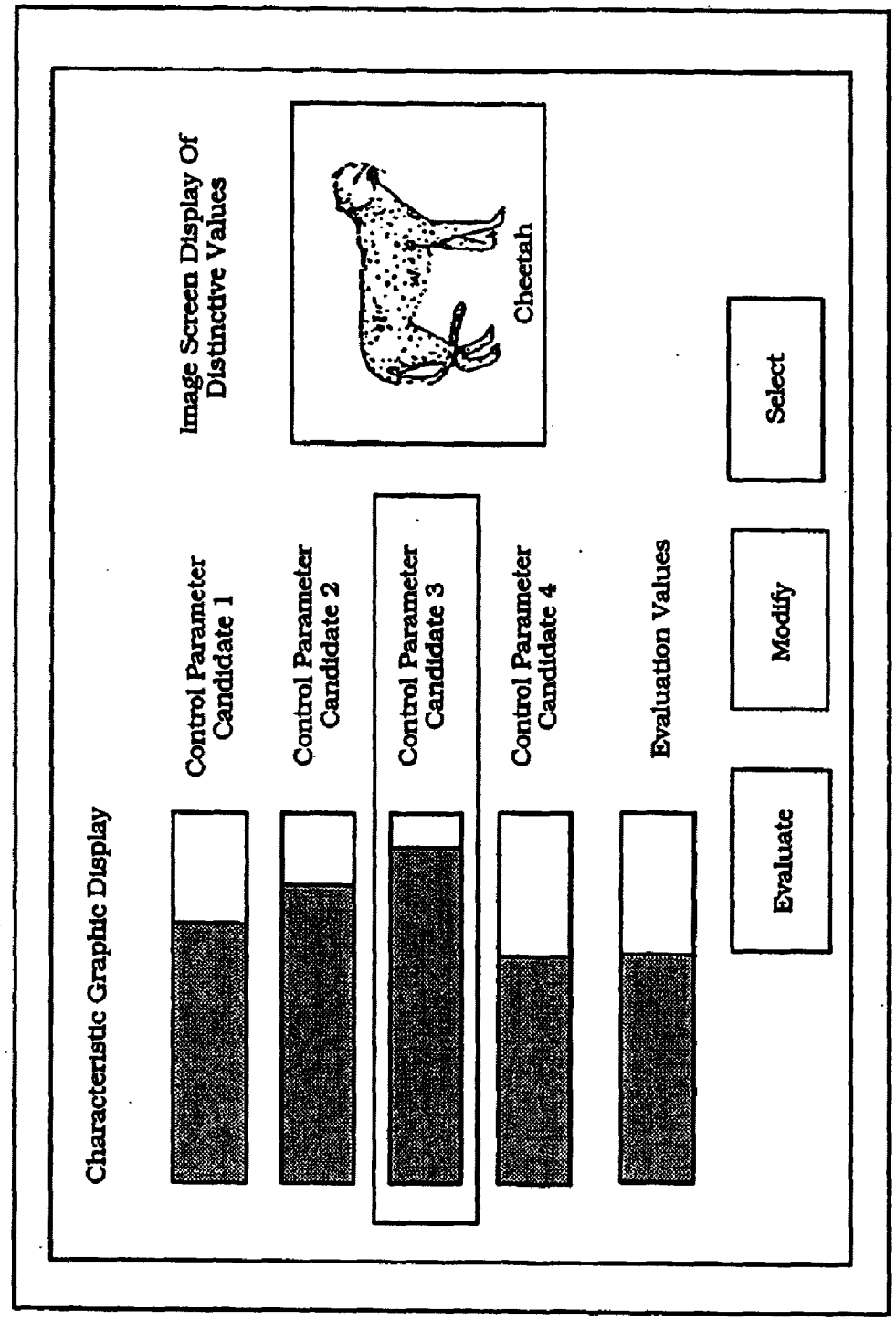

Concretely, for example, as shown in FIG. 23, this may be applied to a robot and the interactive speech or operation of the robot may be automatically changed in accordance with the desires of the user or the environment of use or the like. Furthermore, as shown in FIG. 24, this could be applied to an electric power-assisted bicycle, and the optimal assistance ratio may be constantly outputted in accordance with changes in the condition of use, the age or physical condition of the user, the travel distance or the like. This is the same for wheelchairs with attached auxiliary electric drive apparatuses or electrically driven cars or the like.

As described above, the characteristic control device for control subjects in accordance with an aspect of the present invention has the effects of making it possible to adjust, flexibly and in detail, the characteristics of a control subject to the conditions of use of the control subject, such as the level of skill or preference of the user, or the environment of use or the like, without placing a burden on the user.

Furthermore, the characteristic control device for control subjects in accordance with another aspect of the present invention makes it possible to adjust the characteristics of the control subject in greater detail to the conditions of operation which are dependent on the user, such as the preference or level of skill or the like of the user, and it also provides the user with the enjoyment of playing a role in the generation of the characteristics of the control subject.

Furthermore, the characteristic control device for control subjects in accordance with a further aspect of the present invention exhibits a number of dramatic effects in that the user can select whether or not to use a characteristic control device when buying the product, or may add a characteristic control device after buying the product, so that the range of selectivity of the user with respect to the product which is the control subject is broadened, and furthermore, by making the characteristic control device attachable and detachable, it becomes possible for the user to conduct customization with respect to the characteristics at an arbitrary position, and furthermore, it is possible to modify the characteristics of a plurality of control subjects of the same type, or a plurality of types of control subjects, with a single characteristic control device, and additionally, it is possible to easily exchange one or the other of the control subject and the characteristic control device.

Furthermore, this also has effects in that, by structuring the characteristic control device and the control device of the control subject so as to be separate, limitations on the design of the characteristic control device are reduced, and it becomes possible to construct the characteristic control device using a standard computer, and by doing this, the user may employ an interface which is generally provided with a standard computer or may employ the Internet, and furthermore, simply by purchasing an inexpensive interface, it is possible to employ a computer which the user already has and knows how to operate when customizing the characteristics of the control subject.

What is claimed is:

1. A characteristic control device which is provided with:
   a characteristic control module which controls control parameters and is provided separately from a control device which is provided with a basic control module which outputs output values to control output of a control subject based on input data and control parameters which relate the output values to the input data, wherein the input data relate to weather conditions,
   said characteristic control module comprising:
      a characteristic storage mechanism which stores basic control parameters associated with characteristic data, and
      a characteristic automatic modification mechanism which outputs the control parameters to the basic control module, based on the basic control parameters and the characteristic data stored in the characteristic storage mechanism and the input data, said characteristic automatic modification mechanism (i) evaluating current characteristics of operation based on the input data, (ii) comparing the stored characteristic data and the current characteristics, and (iii) modifying the stored basic control parameters associated with the stored characteristic data based on the comparison of the current characteristics with the stored characteristic data, thereby outputting the control parameters.

2. A characteristic control device which is provided with:
   a characteristic control module which controls control parameters and is provided separately from a control device which is provided with a basic control module which outputs output values to control output of a control subject based on input data and control parameters which relate the output values to the input data, wherein at least one of the input data relate to the bodily condition of an operator of the control subject,
   said characteristic control module comprising:
      a characteristic storage mechanism which stores basic control parameters associated with characteristic data, and
      a characteristic automatic modification mechanism which outputs the control parameters to the basic control module, based on the basic control parameters and the characteristic data stored in the characteristic storage mechanism and the input data, said characteristic automatic modification mechanism (i) evaluating current characteristics of operation based on the input data, (ii) comparing the stored characteristic data and the current characteristics, and (iii) modifying the stored basic control parameters associated with the stored characteristic data based on the comparison of the current characteristics with the stored characteristic data, thereby outputting the control parameters.

3. A characteristic control device in accordance with claim 2, wherein the input data relate to body temperature.

4. A characteristic control device in accordance with claim 2, wherein the input data relate to pulse rate.

5. A characteristic control device in accordance with claim 2, wherein the input data relate to an amount of perspiration.

6. A characteristic control device which is provided with:
   a characteristic control module which controls control parameters and is provided separately from a control device which is provided with a basic control module which outputs output values to control output of a control subject based on input data and control parameters which relate the output values to the input data, wherein at least one of the input data relates to identification of an operator of the control subject,
   said characteristic control module comprising:
      a characteristic storage mechanism which stores basic control parameters associated with characteristic data, and
      a characteristic automatic modification mechanism which outputs the control parameters to the basic control module, based on the basic control parameters and the characteristic data stored in the characteristic storage mechanism and the input data, said characteristic automatic modification mechanism (i) evaluating current characteristics of operation based on the input data, (ii) comparing the stored characteristic data and the current characteristics, and (iii) modifying the stored basic control parameters associated with the stored characteristic data based on the comparison of the current characteristics with the stored characteristic data, thereby outputting the control parameters.

7. A characteristic control device in accordance with claim 6, wherein the input data are derived from the pattern of operation.

8. A characteristic control device in accordance with claim 6, wherein the input data relate to the fingerprint of the operator.

9. A characteristic control device in accordance with claim 6, wherein the input data relate to the iris of the operator.

* * * * *

UNITED STATES PATENT AND TRADEMARK OFFICE
CERTIFICATE OF CORRECTION

PATENT NO. : 6,961,625 B2
DATED : November 1, 2005
INVENTOR(S) : Ichikai Kamihira It is certified that error appears in the above-identified patent and that said Letters Patent is hereby corrected as shown below:

Drawings,
Delete Figure 22, and substitute Figure 22, (attached).

Signed and Sealed this

Second Day of May, 2006

JON W. DUDAS
*Director of the United States Patent and Trademark Office*